(12) United States Patent
Xie et al.

(10) Patent No.: US 11,991,012 B2
(45) Date of Patent: May 21, 2024

(54) PACKET FORWARDING METHOD, PACKET SENDING APPARATUS, AND PACKET RECEIVING APPARATUS

(71) Applicant: HUAWEI TECHNOLOGIES CO., LTD., Shenzhen (CN)

(72) Inventors: Jingrong Xie, Beijing (CN); Yang Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 17/241,464

(22) Filed: Apr. 27, 2021

(65) Prior Publication Data
US 2021/0266189 A1    Aug. 26, 2021

Related U.S. Application Data

(63) Continuation of application No. PCT/CN2019/128112, filed on Dec. 25, 2019.

(30) Foreign Application Priority Data

Nov. 2, 2018 (CN) .......................... 201811301263.0

(51) Int. Cl.
*H04L 12/741* (2013.01)
*H04L 12/18* (2006.01)
(Continued)

(52) U.S. Cl.
CPC .......... *H04L 12/18* (2013.01); *H04L 12/4633* (2013.01); *H04L 12/4641* (2013.01); *H04L 45/74* (2013.01); *H04L 67/56* (2022.05)

(58) Field of Classification Search
CPC ... H04L 12/18; H04L 12/413; H04L 12/4633; H04L 12/4641; H04L 45/16; H04L 45/34; H04L 45/74; H04L 45/741; H04L 67/56
See application file for complete search history.

(56) References Cited

U.S. PATENT DOCUMENTS

| 9,942,053 | B2 | 4/2018 | Wijnands et al. |
| 2003/0088697 | A1* | 5/2003 | Matsuhira ............... H04L 69/16 709/245 |

(Continued)

FOREIGN PATENT DOCUMENTS

| CN | 105141525 A | 12/2015 |
| CN | 105530159 A | 4/2016 |

(Continued)

OTHER PUBLICATIONS

Dawra et al., BGP Signaling of IPV6-Segment-Routing-based VPN Networks, draft-dawra-idr-srv6-vpn-04, Inter-Domain Routing Internet-Draft, Jun. 25, 2018, total 21 pages.

Filsfils et al., SRv6 Network Programming, draft-filsfils-spring-srv6-network-programming-04, Spring Internet-Draft, Mar. 4, 2018, total 57 pages.

Geng et al, MVPN using Segment Routing and BIER for High Reachability Multicast Deployment, draft-geng-bier-sr-multicast-deployment-00, Network Working Group, Jul. 2, 2018, total 10 pages.

(Continued)

*Primary Examiner* — Mansour Oveissi
(74) *Attorney, Agent, or Firm* — Maier & Maier, PLLC

(57) ABSTRACT

A packet forwarding method. The method includes: a first node configures a first identifier of a first VPN and a first IPv6 address on a control plane. The first node sends a first indication message to a second node, where the first indication message carries the first identifier and the first IPv6 address. The second node first determines, based on locally configured information about the first VPN and the first identifier in the first indication message, a second identifier that is of the second node and that satisfies a preset correspondence with the first identifier, and then establishes a correspondence between the first IPv6 address and the second identifier. The first node encapsulates, on a forwarding plane based on the first IPv6 address, a multicast data packet belonging to the first VPN, to obtain a to-be-forwarded BIER packet and sends the to-be-forwarded BIER packet.

12 Claims, 12 Drawing Sheets

(51) Int. Cl.
  *H04L 12/46* (2006.01)
  *H04L 45/74* (2022.01)
  *H04L 67/56* (2022.01)

(56) References Cited

U.S. PATENT DOCUMENTS

| | | | |
|---|---|---|---|
| 2013/0215891 A1* | 8/2013 | Perreault | H04L 45/16 370/390 |
| 2015/0078378 A1 | 3/2015 | Wijnands et al. | |
| 2015/0078379 A1 | 3/2015 | Wijnands et al. | |
| 2015/0131660 A1* | 5/2015 | Shepherd | H04L 45/74 370/390 |
| 2016/0142248 A1 | 5/2016 | Thubert et al. | |
| 2018/0205565 A1 | 7/2018 | Wijnands et al. | |
| 2020/0412562 A1* | 12/2020 | Peng | H04L 45/16 |

FOREIGN PATENT DOCUMENTS

| | | |
|---|---|---|
| CN | 106572017 A | 4/2017 |
| CN | 106572023 A | 4/2017 |
| CN | 106656524 A | 5/2017 |
| CN | 106656794 A | 5/2017 |
| CN | 107623630 A | 1/2018 |
| CN | 107645446 A | 1/2018 |
| CN | 108632150 A | 10/2018 |
| JP | 2005236640 A | 9/2005 |
| JP | 2018530969 A | 10/2018 |
| WO | 2015/042159 A1 | 3/2015 |
| WO | 2017/009755 A1 | 1/2017 |
| WO | 2019/205799 A1 | 10/2019 |

OTHER PUBLICATIONS

Filsfils et al., IPV6 Segment Routing Header (SRH), draft-ietf-6man-segment-routing-header-14, Network Working Group, Jun. 28, 2018, total 29 pages.

Previdi et al., Segment Routing Prefix SID extensions for BGP, draft-ietf-idr-bgp-prefix-SID-27, IDR Internet-Draft, Jun. 26, 2018, total 17 pages.

Xie et al., Encapsulation for BIER in Non-MPLS IPv6 Networks, draft-xie-bier-6man-encapsulation-02, Network Working Group, Sep. 1, 2018, total 11 pages.

Krishnan et al., Request for Comments: 6564, A Uniform Format for IPV6 Extension Headers, Internet Engineering Task Force (IETF), Apr. 2012, total 6 pages.

Deering et al., Request for Comments: 8200, Internet Protocol, Version 6 (IPv6) Specification, Internet Engineering Task Force (IETF), Jul. 2017, total 42 pages.

Wijnands et al., Request for Comments: 8279, Multicast Using Bit Index Explicit Replication (BIER), Internet Engineering Task Force (IETF), Nov. 2017, total 43 pages.

Wijnands et al., Request for Comments: 8296, Encapsulation for Bit Index Explicit Replication (BIER) in MPLS and Non-MPLS Networks, Internet Engineering Task Force (IETF), Jan. 2018, total 24 pages.

Request for Comments: 8556, E. Rosen, Ed. et al, "Multicast VPN Using Bit Index Explicit Replication (BIER)", Internet Engineering Task Force (IETF), Apr. 2018, 17 pages.

* cited by examiner

PACKET FORWARDING METHOD, PACKET SENDING APPARATUS, AND PACKET RECEIVING APPARATUS

CROSS-REFERENCE TO RELATED APPLICATIONS

This application a continuation of International Application No. PCT/CN2019/128112, filed on Dec. 25, 2019, which claims priority to Chinese Patent Application No. 201811301263.0, filed on Nov. 2, 2018. The disclosures of the aforementioned applications are hereby incorporated by reference in their entireties.

TECHNICAL FIELD

The embodiments relate to the communications field, and more specifically, to a packet forwarding method, a packet sending apparatus, and a packet receiving apparatus.

BACKGROUND

Efficient point-to-multipoint data transmission in an internet protocol (IP) network is implemented by using an IP multicast technology, to effectively save network bandwidth and reduce network load. Therefore, the IP multicast technology is widely used in real-time data transmission, multimedia conferencing, data copy, internet protocol television (IPTV), games, simulation, and the like. Currently, multicast technology is usually implemented by using a protocol independent multicast (PIM) protocol, a multicast source discovery protocol (MSDP), or the like. A common feature of these multicast protocols is that a control plane multicast tree needs to be constructed. A network plane is logically processed into a tree by using the multicast tree to implement point-to-multipoint data forwarding, loop avoidance, and the like during multicast forwarding. Such an intermediate node in a multicast routing protocol in which a distribution tree is constructed as a core needs to maintain a complex status of multicast forwarding information. As a network's scale grows and multicast data traffic is increased, the multicast technology faces increasingly high costs and big operation and maintenance challenges.

In view of this, a new technology for constructing a multicast forwarding path is proposed in the industry and is referred to as bit index explicit replication (BIER) technology. A new multicast technical architecture for which a multicast distribution tree does not need to be constructed is proposed in the technology. A router that supports the BIER technology is referred to as a bit forwarding router (BFR). A multicast forwarding domain that includes the BFR is referred to as a BIER domain. At an edge of the BIER domain, a router that encapsulates and forwards multicast data of a user is referred to as a bit forwarding ingress router (BFIR), and an edge BFR device that decapsulates a BIER packet is referred to as a bit forwarding egress router (BFER). The multicast data is encapsulated by the BFIR and enters the BIER domain, is forwarded based on a header of a BIER packet in the BIER domain and leaves the BIER domain after passing through one or more BFER devices. In the BIER domain, a device that receives and forwards the BIER packet is referred to as a transit BFR corresponding to the multicast data. A BFR may be a BFIR or a BFER depending on whether a packet is encapsulated or decapsulated.

In the conventional technology, an existing mechanism is still used for a multicast virtual private network (VPN) over bit index explicit replication BIER. To be specific, a BIER packet needs to be encapsulated or decapsulated based on a VPN label (VpnLabel) field. This reduces BIER packet encapsulation or decapsulation performance. Therefore, how to improve BIER packet encapsulation or decapsulation performance and further improve BIER packet forwarding performance become urgent problems to be resolved.

SUMMARY

The embodiments provide a packet forwarding method and a node, to improve BIER packet encapsulation or decapsulation performance and BIER packet forwarding performance.

According to a first aspect, a packet forwarding method is provided, and is applied to a multicast VPN over bit index explicit replication BIER. The method includes: a first node configures a first identifier of a first VPN and a first internet protocol version 6 (IPv6) address, where the first IPv6 address corresponds to the first identifier. The first node sends a first indication message to a second node, where the first indication message is used to indicate the second node to establish a correspondence between the first IPv6 address and a second identifier, the first indication message includes the first identifier and the first IPv6 address, and the second identifier is an identifier that is of the second node and that satisfies a preset correspondence with the first identifier. The first node receives a multicast data packet that belongs to the first VPN. The first node obtains the first IPv6 address based on the first VPN to which the multicast data packet belongs and the first IPv6 address corresponding to the first identifier. The first node encapsulates the multicast data packet based on the first IPv6 address to obtain a to-be-forwarded BIER packet, and sends the to-be-forwarded BIER packet, where the to-be-forwarded BIER packet includes the first IPv6 address.

According to the packet forwarding method provided in the embodiments, on a control plane, the first node configures the first identifier and the first IPv6 address for the first VPN and sends the first identifier and the first IPv6 address to the second node by using the first indication message, where the first identifier corresponds to the first IPv6 address. In this way, the second node can further determine the correspondence between the first IPv6 address and the second identifier based on the preset correspondence that is locally configured for the first VPN and that is satisfied between the second identifier and the first identifier. On a forwarding plane, when receiving, through an interface corresponding to the first VPN, the multicast data packet that belongs to the first VPN, the first node correspondingly obtains the first IPv6 address by using the first identifier and the first IPv6 address; and encapsulates the multicast data packet based on the first IPv6 address to obtain the to-be-forwarded BIER packet, and sends the BIER packet to the second node, but does not need to encapsulate the packet based on a VpnLabel, to improve BIER packet encapsulation performance and BIER packet sending performance of the first node.

It may be understood that "first" and "second" are merely intended to distinguish between different nodes, and are non-limiting in the embodiments. The first node is a node that encapsulates a packet on the packet forwarding link, and the second node is a node that decapsulates a packet on the packet forwarding link. The first node may also be referred to as a head node, a head device, or a routing device that encapsulates a packet. The second node may also be referred to as a tail node, a tail device, or a routing device that decapsulates a packet.

It may be further understood that because the multicast data packet carries a source address of the multicast data packet and a group address of the multicast data packet, and the second node sends a source address and a group address to the first node, where the source address of the multicast data packet is the same as the source address sent by the second node, and the group address of the multicast data packet is the same as the group address sent by the second node, the first node determines that the multicast data packet needs to be sent to the second node. The first node learns that the second node is a node that is interested in the multicast data packet, and therefore determines that the multicast data packet needs to be sent to the second node.

It may be further understood that in this embodiment, packet forwarding and decapsulation are described from a perspective of a second node. The first node may send the multicast data packet to a plurality of second nodes. In other words, the plurality of second nodes may be interested in the multicast data packet. However, an action performed by each second node is similar to that performed by the foregoing second node. Therefore, details are not described herein again.

With reference to the first aspect, in some implementations of the first aspect, before the first node encapsulates the multicast data packet based on the first IPv6 address, the method further includes: the first node receives a second indication message sent by the second node, where the second indication message includes an IPv6 address of the second node. The first node obtains an IPv6 address of a proxy node based on the second indication message and preset configuration information, where the preset configuration information includes a correspondence between the IPv6 address of the second node and the IPv6 address of the proxy node. That the first node encapsulates the multicast data packet based on the first IPv6 address to obtain a to-be-forwarded BIER packet, and sends the to-be-forwarded BIER packet includes: the first node encapsulates an IPv6 header at an outer layer of the multicast data packet to obtain the to-be-forwarded BIER packet, where a source address of the IPv6 header is the first IPv6 address, and a destination address of the IPv6 header is the IPv6 address of the proxy node. The first node sends the to-be-forwarded BIER packet to the second node based on the IPv6 header through the proxy node. According to the packet forwarding method provided in the embodiments, before the first node encapsulates the multicast data packet, the first node further receives the second indication message sent by the second node, and determines a packet forwarding path based on the second indication message and the local preset configuration information. When the preset configuration information includes the correspondence between the IPv6 address of the second node and the IPv6 address of the proxy node, the first node encapsulates the multicast data packet, and encapsulates the IPv6 header at the outer layer of the multicast data packet. In the embodiments, the IPv6 header encapsulated at the outer layer of the packet may be referred to as an outer IPv6 header, the source address carried in the outer IPv6 header is the first IPv6 address, and the destination address carried in the outer IPv6 header is the IPv6 address of the proxy node. The first node can configure an address of the proxy node through which the first node arrives at the second node, and perform encapsulation based on the configuration.

It may be understood that the foregoing correspondence between the IPv6 address of the second node and the IPv6 address of the proxy node refers to learning, based on the correspondence, that the BIER packet is forwarded to the second node through the proxy node. For the proxy node, the BIER packet may be forwarded to a plurality of second nodes through the proxy node. In other words, the preset configuration information can indicate to forward the BIER packet to the second node through the proxy node. However, in the embodiments, a case in which the BIER packet can be forwarded only to the second node through the proxy node is not limited.

With reference to the first aspect, in some implementations of the first aspect, before the first node encapsulates the multicast data packet based on the first IPv6 address, the method further includes: the first node receives a second indication message sent by the second node, where the second indication message includes an IPv6 address of the second node. The first node obtains an IPv6 address of a specified node and an IPv6 address of a proxy node based on the second indication message and preset configuration information, where the preset configuration information includes a correspondence between the IPv6 address of the second node, the IPv6 address of the specified node, and the IPv6 address of the proxy node. That the first node encapsulates the multicast data packet based on the first IPv6 address to obtain a to-be-forwarded BIER packet, and sends the to-be-forwarded BIER packet includes: The first node encapsulates a segment routing header SRH at an outer layer of the multicast data packet, where the SRH carries an address list, and the address list includes the IPv6 address of the specified node and the IPv6 address of the proxy node. The first node encapsulates an IPv6 header at an outer layer of the SRH to obtain the to-be-forwarded BIER packet, where a source address of the IPv6 header is the first IPv6 address, and a destination address of the IPv6 header is the IPv6 address of the specified node. The first node sends the to-be-forwarded BIER packet to the second node based on the SRH and the IPv6 header through the specified node and the proxy node.

According to the packet forwarding method provided in the embodiments, the first node may further configure an address of the specified node that arrives at the proxy node, encapsulate the packet based on the configuration, and provide a flexible configuration solution.

With reference to the first aspect, in some implementations of the first aspect, the second indication message includes a border gateway protocol multicast VPN (BGP-MVPN) route message.

With reference to the first aspect, in some implementations of the first aspect, the method further includes: the first node encapsulates preset information indicating the second node. That the first node encapsulates preset information indicating the second node includes: the first node encapsulates an IPv6 destination option header, where the IPv6 destination option header includes a BIER header, and the BIER header carries the preset information indicating the second node; or the first node encapsulates a BIER extension header, where the BIER extension header carries the preset information indicating the second node, and the BIER extension header is a newly added IPv6 extension header.

According to the packet forwarding method provided in the embodiments, the first node may further extend an existing IPv6 extension header to encapsulate the preset information indicating the second node, or define a new IPv6 extension header to encapsulate the preset information indicating the second node; and provide a plurality of selection solutions for encapsulating the preset information indicating the second node, to improve packet encapsulation flexibility.

With reference to the first aspect, in some implementations of the first aspect, the first indication message includes at least one of the following messages: a BGP-MVPN route message, a BGP-VPN route message, or a BGP Ethernet VPN (BGP-EVPN) route message.

According to a second aspect, a packet forwarding method is provided, and is applied to a multicast VPN over BIER. The method includes: a second node receives a first indication message from a first node, where the first indication message includes a first identifier of a first VPN and a first IPv6 address, and the first identifier corresponds to the first IPv6 address. The second node establishes a correspondence between the first IPv6 address and a second identifier based on the first IPv6 address and the first identifier, where the second identifier is an identifier that is of the second node and that satisfies a preset correspondence with the first identifier. The second node receives a BIER packet from the first node, where the BIER packet includes the first IPv6 address and a multicast data packet. The second node sends, based on the first IPv6 address and the correspondence between the first IPv6 address and the second identifier, the multicast data packet to an interface corresponding to the second identifier.

According to the packet forwarding method provided in the embodiments, the second node determines the correspondence between the first IPv6 address and the second identifier on a control plane based on the locally configured second identifier of the first VPN, and the first identifier and the first IPv6 address that are carried in the received first indication message. On a forwarding plane, after receiving the BIER packet, the second node determines, based on the first IPv6 address carried in the BIER packet, to send the multicast data packet carried in the BIER packet to the interface corresponding to the second identifier. In a packet decapsulation process, the second node does not need to determine, based on a VpnLabel, to send the multicast data packet to the interface corresponding to the second identifier, to improve packet decapsulation performance.

With reference to the second aspect, in some implementations of the second aspect, before the second node receives the BIER packet from the first node, the method further includes: The second node sends a second indication message to the first node, where the second indication message includes an IPv6 address of the second node.

According to the packet forwarding method provided in the embodiments, the second node needs to send a multicast join packet to the first node, so that the first node can learn of the multicast data packet in which the second node is interested.

With reference to the second aspect, in some implementations of the second aspect, that the second node sends, based on the first IPv6 address and the correspondence, the multicast data packet to an interface corresponding to the second identifier includes: the second node obtains the second identifier based on the first IPv6 address and the correspondence. After determining that the multicast data packet includes an address of a multicast source and an address of a multicast group, the second node obtains at least one interface corresponding to the second identifier, and sends the multicast data packet through the at least one interface, where the address of the multicast source is an address of a multicast source that needs to be received by the second node, and the address of the multicast group is an address of a multicast group that the second node joins.

According to the packet forwarding method provided in the embodiments, when decapsulating the received BIER packet, the second node first determines, based on preset information that indicates the second node and that is carried in the BIER packet, that the BIER packet is decapsulated by the second node. The second node further determines, based on the correspondence that is between the first IPv6 address and the second identifier and that is established on the control plane and the first IPv6 address carried in the BIER packet, that the multicast data packet carried in the BIER packet needs to be sent to the interface corresponding to the second identifier. Then, after determining to send the multicast data packet to the interface corresponding to the second identifier, the second node further needs to determine, based on a source address and a destination address that are carried in an inner IPv6 or internet protocol version 4 (IPv4) header of the BIER packet, a specific interface that is in interfaces corresponding to the second identifier and to which the multicast data packet is to be sent. According to the packet forwarding method provided in the embodiments, in a process in which the second node determines a specific interface that corresponds to a local identifier and to which the multicast data packet is to be sent, the second node only needs to perform determining based on the correspondence that is between the first IPv6 address and the second identifier and that is established on the control plane and the first IPv6 address carried in the BIER packet, to simplify the determining process, and improve packet decapsulation performance.

With reference to the second aspect, in some implementations of the second aspect, the second indication message includes a BGP-MVPN route message.

With reference to the second aspect, in some implementations of the second aspect, the first indication message includes at least one of the following messages: a BGP-MVPN route message, a BGP-VPN route message, or a BGP-EVPN route message.

According to a third aspect, a packet sending apparatus is provided. The packet sending apparatus may be configured to perform an operation of the first node according to any one of the first aspect or the possible implementations of the first aspect. The packet sending apparatus includes a corresponding component configured to perform the steps or functions described in the first aspect, and may be the first node in the first aspect. The steps or functions may be implemented by using software, hardware, or a combination of hardware and software.

According to a fourth aspect, a packet receiving apparatus is provided. The packet receiving apparatus may be configured to perform an operation of the second node according to any one of the second aspect or the possible implementations of the second aspect. The packet receiving apparatus includes a corresponding component configured to perform the steps or functions described in the second aspect, and may be the second node in the second aspect. The steps or functions may be implemented by using software, hardware, or a combination of hardware and software.

According to a fifth aspect, a packet forwarding device is provided. A structure of the packet forwarding device includes a processor. The processor is configured to support the packet forwarding device in performing the functions according to any one of the first aspect and the second aspect or the implementations of the first aspect and the second aspect. In a possible implementation, the packet forwarding device may further include a communications interface, configured to support a multicast forwarding device in receiving or sending information.

In a possible embodiment, the packet forwarding device may further include a memory. The memory is configured to: be coupled to the processor, and store program instructions and data that are necessary for the packet forwarding device.

Alternatively, the packet forwarding device includes a memory and a processor. The memory is configured to store a computer program, and the processor is configured to: invoke the computer program from the memory and run the computer program, so that the packet forwarding device performs the packet forwarding method according to any one of the first aspect and the second aspect or the implementations of the first aspect and the second aspect.

According to a sixth aspect, a computer program product is provided. The computer program product includes a computer program (which may also be referred to as code or an instruction). When the computer program is run, a computer is enabled to perform the packet forwarding method according to any one of the first aspect and the second aspect or the possible implementations of the first aspect and the second aspect.

According to a seventh aspect, a computer readable storage medium is provided. The computer readable storage medium stores a program, and the program enables a server in a computer to perform the packet forwarding method according to any one of the first aspect and the second aspect or the possible implementations of the first aspect and the second aspect.

Alternatively, the computer readable storage medium is configured to store a computer software instruction used by the foregoing server, and the computer software instruction includes a program designed for performing the packet forwarding method according to any one of the first aspect and the second aspect or the possible implementations of the first aspect and the second aspect.

According to an eighth aspect, a chip system is provided. The chip system includes a processor, configured to support a server in a computer in implementing the functions according to any one of the first aspect and the second aspect or the implementations of the first aspect and the second aspect.

According to the packet forwarding method and the node in the embodiments, the second node establishes the correspondence between the first IPv6 address and the second identifier on the control plane; on the forwarding plane, when encapsulating the BIER packet, the first node first does not need to use the VpnLabel, but only needs to use the first IPv6 address as the source address of the outer IPv6 header of the BIER packet; and the second node can determine, based on the correspondence that is between the first IPv6 address and the second identifier and that is established on the control plane and the first IPv6 address carried in the received BIER packet, that the multicast data packet carried in the BIER packet needs to be sent to the interface corresponding to the second identifier that has the correspondence with the first IPv6 address. In this way, BIER packet encapsulation or decapsulation performance is improved.

DETAILED DESCRIPTION OF THE EMBODIMENTS

The following describes solutions in the embodiments with reference to accompanying drawings.

The solutions in the embodiments may be applied to a node that supports one or more of an IPv6 function, a segment routing version 6 (SRv6) function, or a BIER IPv6 forwarding function in a multicast VPN. The SRv6 function includes the IPv6 function, and the BIER IPv6 forwarding function includes encapsulation of a BIER IPv6 packet, forwarding of the BIER IPv6 packet, and decapsulation and sending of the BIER IPv6 packet. In the embodiments, the BIER IPv6 packet may also be referred to as a BIER packet.

The foregoing node may be a node such as a router or a switch that can implement BIER packet encapsulation, BIER packet forwarding, and BIER packet decapsulation. The foregoing node may also be referred to as a network element, a device, or another name.

It may be noted that the VPN may be a multicast VPN. For example, the multicast VPN refers to a VPN on which multicast is deployed. The virtual private network may be a layer 3 VPN (L3VPN) or an EVPN. Alternatively, some sites in a public network may deploy multicast. There are some common protocols and methods for deploying multicast on the private network L3VPN/EVPN/the public network. For example, a BGP-MVPN address family message is used when multicast is deployed on the L3VPN. A BGP-EVPN address family message is used when multicast is deployed on the EVPN. The BGP-MVPN address family message is also used when multicast is deployed on the public network, provided that a special identifier is used to identify the public network. In this case, the public network is considered as a special L3VPN or virtual routing and forwarding (VRF).

Figure 1:
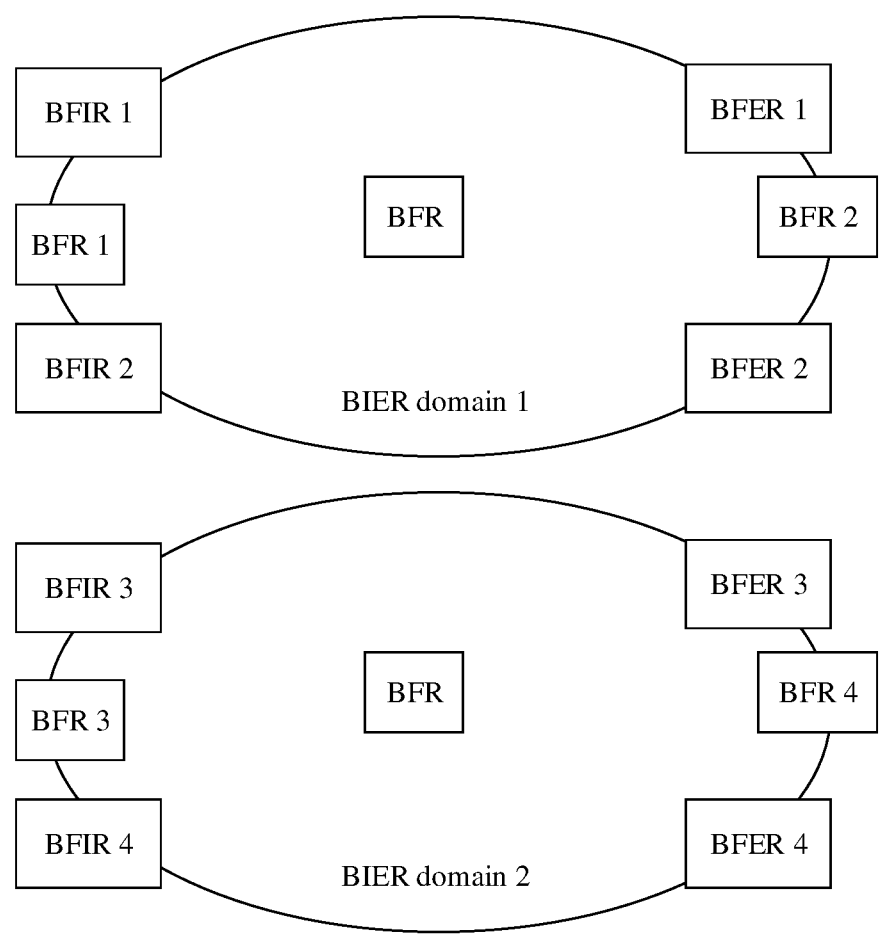
FIG. 1 is a schematic diagram of a BIER packet forwarding architecture.

FIG. 1 is a schematic diagram of a BIER packet forwarding architecture. The schematic diagram includes two different BIER domains (a BIER domain 1 and a BIER domain 2 shown in FIG. 1). At the edges of BIER domain 1 and BIER domain 2, edge BFR nodes that encapsulate multicast data are BFIRs (a BFIR 1 to a BFIR 4 shown in FIG. 1), and edge BFR nodes that decapsulate a BIER packet are BFERs (a BFER 1 to a BFER 4 shown in FIG. 1).

The BFIR may be referred to as a bit forwarding ingress router, a head node, a forwarding device, or the like. The BFER may be referred to as a bit forwarding egress router, a tail node, a leaf node, a receiving device, or the like.

For example, a multicast data packet is encapsulated by using the BFIR to obtain a to-be-forwarded BIER packet. The BIER packet enters the BIER domain, and the BIER packet is forwarded based on a header of the BIER packet in the BIER domain. The BIER packet leaves the BIER domain after passing through one or more BFER devices. In the BIER domain, a device that receives and forwards the BIER packet is referred to as a transit BFR corresponding to the BIER packet. A BFR may be a BFIR or a BFER depending on whether a packet is encapsulated or decapsulated.

For example, when a BFR 1 in FIG. 1 receives a multicast data packet and encapsulates the multicast data packet to obtain a to-be-forwarded BIER packet, the BFR 1 is a BFIR. When the BFR 1 in FIG. 1 receives a BIER packet and decapsulates the BIER packet, the BFR 1 is a BFER.

To better understand a packet forwarding method, a packet sending apparatus, and a packet receiving apparatus provided in the embodiments, the following first describes several basic concepts in the embodiments.

1. BIER Technology

The BIER technology is a multicast technology generated through discussion in the internet engineering task force (IETF) since the end of 2014. The BIER technology is briefly described as follows:

First, a concept of a BIER domain is proposed. The BIER domain is a domain in which a BIER control plane protocol runs.

For example, one domain in which an interior gateway protocol (IGP) runs may be one BIER domain, but a plurality of domains in which the IGP runs cannot be one BIER domain. In the embodiments, a domain in which the IGP runs is referred to as an IGP domain. For example, the BIER domain 1 shown in FIG. 1 may be an IGP domain 1, and the BIER domain 2 shown in FIG. 1 may be an IGP domain 2.

One BIER domain may be divided into a plurality of sub-domains.

For example, one BIER domain is divided into three sub-domains (which are respectively a sub-domain #1, a sub-domain #2, and a sub-domain #3). The sub-domain #1 includes all nodes and all links in the BIER domain, the sub-domain #2 includes all nodes and a first part of links in the BIER domain, and the sub-domain #3 includes some nodes and a second part of links in the BIER domain, where the first part of links and the second part of links are a first part and a second part of all links in the BIER domain.

It may be understood that a related information configuration and a scope of the related information configuration in the BIER domain usually take effect on the sub-domain at a granularity of the sub-domain.

A value is configured for each edge node in the sub-domain, and is used as a BIER forwarding router identifier (BFR-ID).

For example, a value ranging from 1 to 256 is configured for each edge node in the sub-domain #1, and is used as a BFR-ID of each edge node in the sub-domain #1; and a value ranging from 1 to 256 is configured for each edge node in the sub-domain #2, and is used as a BFR-ID of each edge node in the sub-domain #2.

Configuration information of each node in the sub-domain is flooded in the IGP domain in an IGP flood manner. The configuration information of each node includes an IP address of the node, a sub-domain to which the node belongs, a bit forwarding table identifier (BIFT-ID) corresponding to the sub-domain to which the node belongs, and a BFR-ID of the node.

It may be understood that an edge node has a BFR-ID while an intermediate node does not have a BFR-ID. However, the intermediate node has an IP address of the node, a sub-domain to which the node belongs, and BIFT-ID information corresponding to the sub-domain to which the node belongs.

In the IGP flood manner, each node in an IGP domain broadcasts configuration information in the IGP domain to which the node belongs, and all nodes in the IGP domain receive and store configuration information of another node. Further, each node in the IGP domain obtains, through computation based on a general algorithm in IGP in the conventional technology, information about a next-hop node after a BIER packet arrives at an edge node. Each node in an IGP domain has known a specific node that is in a specific sub-domain and to which each BFR-ID corresponds. Each node in the IGP domain establishes a forwarding table on a control plane. A process of establishing the forwarding table is similar to a prior-art process of establishing a forwarding table on a control plane. Details are not described herein.

After each node in the IGP domain establishes the forwarding table on the control plane, each node in the IGP domain may forward the BIER packet on a forwarding plane based on a correspondence in the forwarding table. A value of each bit in a bitstring in the BIER packet is used to identify a next-hop node corresponding to the BIER packet.

For example, the least significant bit (rightmost bit) in the bitstring is used to indicate that the next-hop node corresponding to the BIER packet is a node corresponding to a BFR-ID 1. The second bit from right to left in the bitstring is used to indicate that the next-hop node corresponding to the BIER packet is a node corresponding to a BFR-ID 2.

An example is used below to briefly describe how the bitstring indicates the next-hop node corresponding to the BIER packet.

It is assumed that the bitstring has a total of four bits, and it is stipulated that when a value of a bit in the bitstring is 1, it indicates that the BIER packet is forwarded, or when a value of a bit in the bitstring is 0, it indicates that the BIER packet is not forwarded.

When the bitstring is 0001, it is determined, on the forwarding plane based on the bitstring in the BIER packet, that the BIER packet needs to be sent to the node corresponding to the BFR-ID 1. When the bitstring is 0011, it is determined, on the forwarding plane based on the bitstring in the BIER packet, that the BIER packet needs to be sent to the node corresponding to the BFR-ID 1 and the node corresponding to the BFR-ID 2.

Further, when a plurality of bits in the bitstring in the BIER packet correspond to a same next-hop node, only one BIER packet needs to be sent to the next-hop node.

For example, the two least significant bits in the bitstring are used to indicate that the next-hop node of the BIER packet is a node corresponding to a BFR-ID 1. It is assumed that the bitstring has a total of four bits, and it is stipulated that when a value of a bit in the bitstring is 1, it indicates that the BIER packet is forwarded, or when a value of a bit in the bitstring is 0, it indicates that the BIER packet is not forwarded.

When the bitstring is 0011, it is determined, on the forwarding plane based on the bitstring in the BIER packet, that the BIER packet needs to be sent to the node corresponding to the BFR-ID 1, and only one BIER packet needs to be sent to the node corresponding to the BFR-ID 1. A reason is as follows: when the least significant bit in 0011 is traversed, it is determined that the BIER packet is to be sent to the node corresponding to the BFR-ID 1, and a right bit next to the least significant bit is cleared and then is not traversed. Instead, the third bit from right to left is directly traversed.

It may be understood that how to determine the next-hop node corresponding to the BIER packet based on the bitstring in the BIER packet is merely an example, and is non-limiting on the embodiments. For example, a function of the bitstring is similar to that of a bitstring in the conventional technology. Details are not described herein.

As described above, packet forwarding is determined on the forwarding plane based on the bitstring in the BIER packet. In this case, a key to implementing BIER packet forwarding on the forwarding plane is a header format of the BIER packet. The following briefly describes the header format of the BIER packet with reference to the accompanying drawings.

Figure 2:
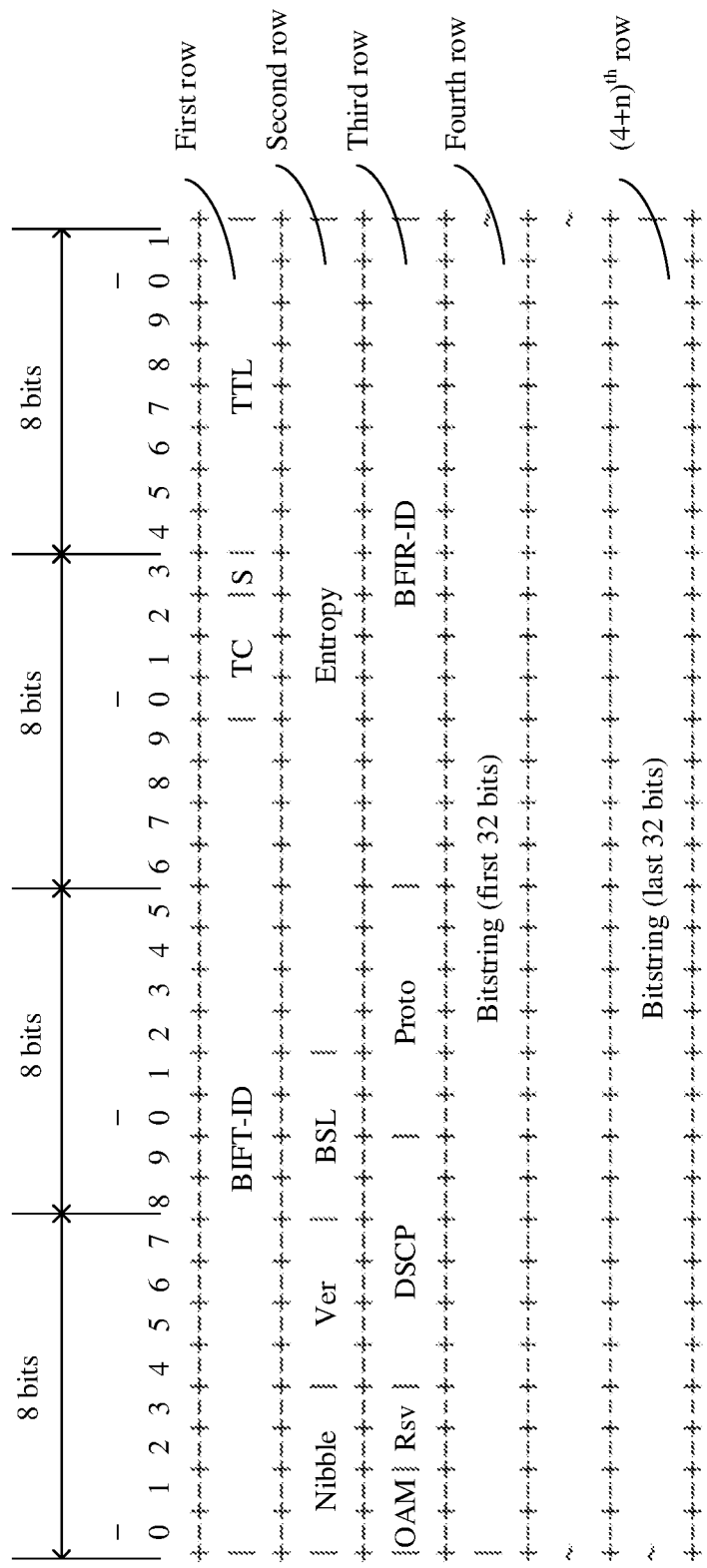
FIG. 2 is a schematic diagram of a header format of a BIER packet according to an embodiment.

FIG. 2 is a schematic diagram of a header format of a BIER packet according to an embodiment. The schematic diagram includes a 32-bit (4-byte) BIER label or BIFT-ID value. The first 20 bits in 32 bits are a BIER label value or a BIFT-ID value, and the last 12 bits in the 32 bits are other information (as shown in the first row in FIG. 2) with a BIER label or BIFT-ID.

The other information with the BIER label or BIFT-ID includes information such as a traffic class TC), a bottom of stack (S), and a time to live (TTL) of one packet on a network that are shown in the first row in FIG. 2.

It may be understood that the BIER label or the BIFT-ID are two different names of 20 bits of the header format of the BIER packet in different scenarios. During BIER packet forwarding, a BIER header follows an extension header, and a data packet is encapsulated after the BIER header.

The following two cases are separately described.

1. The BIER header is encapsulated in a multiprotocol label switching (MPLS) label stack or encapsulated after the Ethernet. For example, on an Ethernet link, if an Ethernet type is 0x8847, it indicates that encapsulation after the Ethernet is MPLS encapsulation. If the first label in the label stack is a BIER label, the BIFT-ID is actually an MPLS label, and is referred to as the BIER label.

2. The BIER header is not encapsulated in an MPLS label stack. For example, on an Ethernet link, if an Ethernet type is 0xAB37, it indicates that encapsulation after the Ethernet is non-MPLS BIER encapsulation. In this case, the BIFT-ID is not an MPLS label, but is directly the BIFT-ID.

Therefore, the BIFT-ID is used in a non-MPLS scenario, and the BIFT label is used in an MPLS scenario.

The header format of the BIER packet shown in the schematic diagram further includes other fields with 64 bits (8 bytes) (as shown in the second row and the third row in FIG. 2). For example, the other fields include fields such as a nibble, a version (Ver), a bitstring length (BSL), an information entropy, operation, administration, and maintenance (OAM), a revised standard version (Rsv), a differentiated services code point (DSCP), a protocol, and a BFIR-ID that are shown in the second row and the third row in FIG. 2

The header format of the BIER packet shown in the schematic diagram further includes a bitstring. For example, the bitstring may have a length such as 64 bits, 128 bits, or 256 bits (a value of n in FIG. 2 varies with the length of the bitstring, and when the length of the bitstring is 64 bits, n=1, that is, the bitstring is in the fourth row and the fifth row in FIG. 2). The value of the BIER label or the BIFT-ID shown in the first row in FIG. 2 may be used to determine the length of the bitstring.

2. IPv6 Technology

IPv6 is the internet protocol version 6. A previously widely used internet protocol is the IPv4. A large difference between IPv6 and IPv4 is as follows:

An IPv6 header is divided into a basic IPv6 header and an IPv6 extension header in IPv6. Some IPv6 extension headers are defined in IPv6, and the extension headers may be further extended.

For example, an existing IPv6 extension header defined in IPv6 is further extended in a type length value (TLV) manner. In some cases, a new IPv6 extension header is allowed to be added through extension. However, in the IPv6 protocol, extending the existing IPv6 extension header is recommended, but adding the new IPv6 extension header is not recommended.

For another example, SRv6 is a sub-type extended on an existing IPv6 extension header (a type is a routing header), but is not a type of a newly defined IPv6 extension header that is parallel to the IPv6 extension header and the routing header.

It may be understood that in the IPv6 protocol, adding the new IPv6 extension header is not recommended, but further extending the existing IPv6 extension header is recommended. However, the new IPv6 extension header can still be added if there are sufficient reasons.

Figure 3:
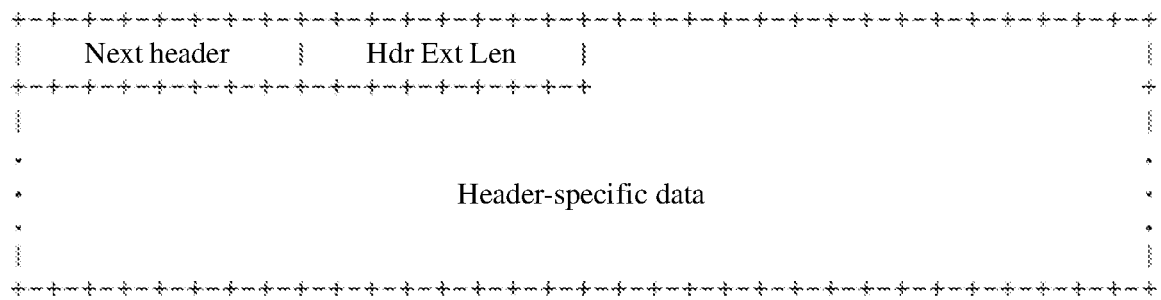
FIG. 3 is a schematic diagram of a format of an IPv6 extension header according to an embodiment.

For example, various IPv6 extension headers are generally in a format shown in FIG. 3. The format shown in FIG. 3 may indicate a plurality of extension headers already defined in current IPv6 and a format of a newly added IPv6 extension header that may be defined in the future.

FIG. 3 is a schematic diagram of a format of an IPv6 extension header according to an embodiment. The schematic diagram includes a format of a next header. The next header in the IPv6 extension header indicates that there is a specific type of extension header after the IPv6 extension header. In this way, a plurality of extension headers can be supported. In addition, the next header in the IPv6 extension header may also specify an upper layer protocol (ULP).

For example, the next header specifies that the ULP is a transmission control protocol (TCP) or a user datagram protocol (UDP) and indicates that a TCP or UDP header and packet follow the next header.

It may be understood that a basic IPv6 header may also include the next header. The next header indicates that there is a specific type of IPv6 extension header after the basic IPv6 header and specifies an upper layer protocol and is similar to the next header in the IPv6 extension header. Details are not described herein again.

The schematic diagram further includes a header extension length used to indicate a length of the IPv6 extension header.

The schematic diagram further includes header-specific data.

The following briefly describes a BIER packet forwarding process in the conventional technology with reference to FIG. 1.

A BIER packet forwarding method in the conventional technology includes: defining a newly added IPv6 extension header, where the newly added IPv6 extension header is referred to as a BIER extension header. The BIER extension header carries information required for forwarding a BIER packet, for example, the foregoing bitstring information.

A head node receives a multicast data packet, where the multicast data packet carries a source address of the multicast data packet and a group address of the multicast data packet. The head node encapsulates the multicast data packet in a basic IPv6 header and a BIER extension header to generate a to-be-forwarded BIER packet.

An IPv6 destination address in the basic IPv6 header of the to-be-forwarded BIER packet is the group address of the multicast data packet, and the group address is used to indicate that a plurality of tail nodes are interested in the group address. For example, the head node needs to replicate and forward the BIER packet whose destination address is the group address to the plurality of tail nodes.

For example, a tail node #1, a tail node #2, and a tail node #3 each send a message to a head node #1, to indicate that the tail node #1, the tail node #2, and the tail node #3 are interested in a group address #1. In this case, the head node #1 replicates and forwards a BIER packet whose destination address is the group address #1 to the tail node #1, the tail node #2, and the tail node #3.

Further, the head node determines, by querying information such as a bitstring in a BIER extension header at the end of the BIER packet, specific tail nodes to which the BIER packet is to be sent, and determines, by querying the bitstring information and a BIER forwarding table established in the head node, how to send the BIER packet to these tail nodes.

For example, the head node #1 determines, by querying information such as a bitstring in a BIER extension header at the end of the BIER packet, to send the BIER packet to the tail node #1 and the tail node #2, and determines a forwarding path by querying a BIER forwarding table.

In the BIER domain 1 in FIG. 1, the BFIR 1 and the BFIR 2 are BFIRs, and the BFER 1 and the BFER 2 are BFERs. In the BIER domain 2, the BFIR 3 and the BFIR 4 are BFIRs, and the BFER 3 and the BFER 4 are BFERs.

It is assumed that the BIER domain 1 is divided into only a sub-domain #1 that belongs to an IGP domain 1, and the BIER domain 2 is divided into only a sub-domain #2 that belongs to an IGP domain 2. In addition, BFR-IDs of the BFER 1 and the BFER 2 in the sub-domain #1 are respectively a BFR-ID 1 and a BFR-ID 2, and BFR-IDs of the BFER 3 and the BFER 4 in the sub-domain #2 are respectively a BFR-ID 1 and a BFR-ID 2.

When the BFIR 1 is the head node #1, and the BFER 1, the BFER 2, and the BFER 3 are respectively the tail node #1, the tail node #2, and the tail node #3, the BFIR 1 determines, based on messages received from the BFER 1, the BFER 2, and the BFER 3, that the BFER 1, the BFER 2, and the BFER 3 are all interested in the group address #1. In this case, when receiving the multicast data packet carrying the group address #1, the BFIR 1 performs packet encapsulation on the multicast data packet to obtain a to-be-forwarded BIER packet, and an IPv6 destination address in a basic IPv6 header of the to-be-forwarded BIER packet is the group address #1.

Further, the BFIR 1 determines, by querying information such as a bitstring, a BIFT-ID, and a sub-domain in a BIER extension header at the end of the BIER packet, that the BIER packet needs to be forwarded to the BFER 1 corresponding to the BFR-ID 1 in the sub-domain #1 and the BFER 3 corresponding to the BFR-ID 1 in the sub-domain #2. The BFIR 1 determines, based on the BIER forwarding table, that the BIER packet is to be forwarded to the BFER 1 through the intermediate node in the sub-domain #1. The intermediate node and the edge node (the BFER 1 or the BFER 2) in the sub-domain #1 forward the BIER packet to the BFER 3. A forwarding path is determined based on the forwarding table.

In the foregoing BIER packet forwarding manner, the information such as the bitstring required for forwarding the BIER packet needs to be encapsulated in the IPv6 extension header in the BIER extension header, where the IPv6 extension header is a newly added IPv6 extension header, but is not a header obtained through further extending an existing IPv6 extension header. It is clearly stated in RFC 8200 that defining a newly added IPv6 extension header is not recommended but use of an existing IPv6 extension header is recommended. It is specially stated that further extending an IPv6 destination option header is recommended, where the IPv6 destination option header is an IPv6 extension header.

In other words, according to the protocol, the BIER packet forwarding method is not recommended in the IPv6 protocol.

To adapt to the specification of the IPv6 protocol, another BIER packet forwarding method is further proposed in the conventional technology. A newly added TLV is defined in the existing IPv6 destination option header and is referred to as a BIER TLV. The information required for forwarding the BIER packet is stored in the BIER TLV, including the bitstring information.

Further, how to forward the BIER packet through an SRv6 tunnel is further proposed in the BIER packet forwarding method. The following briefly describes, from perspectives of a head node, a tail node, and an intermediate node, how to forward the BIER packet through the SRv6 tunnel in the BIER packet forwarding method.

First, the head node places an IPv6 destination option header including a BIER header after a segment routing header (SRH). Both the SRH and the IPv6 destination option header are existing IPv6 extension headers, and the SRH is placed before the IPv6 destination option header.

Then, on an SRH tunnel endpoint, based on a specific IPv6 destination address in an IPv6 header and a predefined action, the endpoint is responsible for removing the SRH from an IP header and copying a multicast IPv6 address included in the SRH to the IPv6 destination address in the IPv6 header. The SRH tunnel endpoint may be referred to as an intermediate node, and is a router for forwarding a packet.

It may be understood that in unicast SRv6 technology, a packet may carry the SRH or may not carry the SRH when being forwarded through the SRv6 tunnel. However, in the BIER packet forwarding method, the packet definitely carries the SRH when being forwarded through the SRv6 tunnel, and a group address is placed in the SRH. Based on this, advantages are as follows:

SRv6 tunnel endpoints may not need to be mapped to multicast group addresses one by one. For example, when a tunnel endpoint corresponds to an IPv6 destination address and a predefined action, there is no need to consider a specific multicast group address, but the group address is copied to the IPv6 destination address in the IPv6 header after the packet is received.

Then, the head node forwards a BIER IPv6 packet based on the IPv6 destination address. For example, the head node reads the BIER header in the destination option header after the IPv6 header, and duplicates and sends the BIER packet to one or more interfaces based on the information such as the bitstring in the BIER header.

An existing mechanism is still used when the BIER packet forwarding method is applied to a multicast VPN over BIER. A key of the existing mechanism is that the tail node needs to determine, based on a VpnLabel, specific virtual routing and forwarding (VRF) that corresponds to the tail node and to which the received packet belongs. A concept of the VRF corresponds to a concept of a VPN, and each VPN corresponds to one piece of VRF. An MVPN means a VPN for multicast. Therefore, the existing mechanism needs to be used in the MVPN over BIER scenario. The existing mechanism is actually to learn of, based on a packet, specific VRF to which the packet belongs.

For example, a BIER header protocol field 2 (Proto 2) is used to indicate that a packet after the BIER header is a VpnLabel+IP packet.

This means that the packet after the entire IPv6 header and the destination option header of the BIER packet is first a field with a total length of four bytes, the four bytes include a 20-bit VpnLabel field, and an IPv4 or IPv6 packet follows the four bytes.

This also means that after receiving the packet, the tail node needs to determine, based on a VpnLabel value and other fields (such as the two fields: the BIFT-ID and the BFIR-ID in the BIER header shown in FIG. 2) in the BIER header of the packet, specific VRF that corresponds to the tail node and to which the packet belongs, and then can determine, based on a source IP and a destination IP in the IPv4 or IPv6 header after the VpnLabel field and the VRF, specific interfaces that correspond to the VRF and to which the packet needs to be replicated and sent.

In the packet forwarding method, specific VRF that corresponds to the tail node and to which the packet belongs is determined based on the VpnLabel after the BIER header, and then MVPN over BIER forwarding is performed. Features of the packet forwarding method are as follows:

A Proto value (for example, 2) is used in the BIER header to indicate that the VpnLabel follows the BIER header, and then specific VRF to which the packet belongs is determined based on the VpnLabel. The VpnLabel follows the BIER header, and a private IP packet follows the VpnLabel. After the tail node receives the packet, the tail node first learns of, based on the BIFT-ID in the BIER header, a specific sub-domain to which the packet belongs, then learns of, based on the sub-domain and the BFIR-ID in the BIER header, a specific head node from which the packet comes, and finally determines, based on VpnLabel information, specific VRF that corresponds to the tail node and to which the packet corresponds.

The VpnLabel in the packet is allocated by the head node. The head node allocates the VpnLabel information, and transmits the VpnLabel information to the tail node through the control plane, so that the tail node can know, based on the head node and the VpnLabel allocated by the head node, VRF that corresponds to the tail node and to which the packet corresponds. In this case, the head node needs to allocate the VpnLabel, and the packet encapsulated by the head node definitely needs to include information about the head node and the VpnLabel information allocated by the head node.

In conclusion, on the control plane, the head node needs to notify the tail node of a correspondence between the VpnLabel, the BFIR-ID, and the sub-domain, and the tail node stores the correspondence. Then, on the forwarding plane, the head node sends the data packet, and the tail node determines, based on the correspondence, specific VRF that corresponds to the tail node and to which the packet corresponds.

A principle is as follows: on the control plane, a same sub-domain and different BFR-IDs (the BFR-ID of the head node is referred to as the BFIR-ID) need to be configured for the head node in the multicast VPN and the tail node in the multicast VPN.

The head node needs to generate a VpnLabel value, and then sends the three pieces of information (the sub-domain, the BFIR-ID, and the VpnLabel) and the VPN identifier information to the tail node. Then, the tail node maps the VRF in the tail node on the VPN identifier in the message, and establishes a correspondence between the sub-domain, the BFIR-ID, the VpnLabel, and the VRF in the tail node, so that when the packet arrives at the tail node, the tail node can obtain the sub-domain based on the BIFT-ID in the packet, and then determine, based on the BFIR-ID and the VpnLabel in the packet, specific VRF to which the packet belongs.

The disadvantage of determining, based on the three fields: the sub-domain, the BFR-ID, and the VpnLabel, specific VRF to which the packet belongs is as follows: a process of generating a configuration of and the information about the head node in the multicast VPN is complex, a process of establishing the forwarding table by the tail node in the multicast VPN is complex, the packet needs to carry the VpnLabel, and consequently packet forwarding performance is reduced.

In the BIER packet forwarding method, a Proto field in an existing BIER header first needs to be used to identify a type of a subsequent BIER payload and differentiate a VRF instance to which the BIER payload belongs.

For example, Proto 2 indicates that the type of the BIER payload is a packet starting with a VpnLabel allocated by an upstream node. The VpnLabel is used to further differentiate specific VRF to which an IPv4 packet or an IPv6 packet belongs. The VpnLabel needs to be used together with other fields in the BIER header to complete the differentiation. For example, the BIFT-ID and the BFIR-ID in the BIER header and the VpnLabel are used together to complete the differentiation. Reasons are as follows:

The VpnLabel is allocated by the upstream node, and the information about the head node needs to be completed by using the BFIR-ID and the sub-domain (the BFIR-ID is meaningful only in a specific sub-domain).

For example, the head node sends a message to the tail node by using a BGP, where the message includes a VRF identifier of the head node, the BFIR-ID of the head node, the sub-domain, and the VpnLabel that is allocated by the head node and that corresponds to the VRF. Here, the VRF identifier of the head node is a routing target identifier in a BGP-MVPN address family.

The tail node matches the VRF identifier in the message sent by the head node with a VRF identifier configured on the tail node to determine specific VRF to which the message belongs, to know specific VRF that is the tail node and to which the sub-domain, the BFIR-ID, and the VpnLabel correspond, then learns of the sub-domain based on the BIFT-ID in the BIER header of the received packet, and determines, based on the BFIR-ID field in the BIER header of the packet and the VpnLabel field in the packet, specific VRF to which the packet belongs.

In this method, specific VRF to which the packet belongs needs to be learned of by configuring the head node and the tail node to be in a same BIER sub-domain, configuring a unique BFIR-ID in the sub-domain on the head node, and allocating a VpnLabel by the head node. In addition, the three pieces of information and a VRF identifier (for example, a route target extended community attribute in the BGP-MVPN protocol) are sent to each tail node, so that a forwarding table for identifying the VRF of the packet can be established on the tail node.

Disadvantages of the method are as follows:

1. The head node needs to allocate the VpnLabel and encapsulates the VpnLabel in the packet, where the VpnLabel occupies four bytes. Because an SRv6-VPN does not include any MPLS label, an encapsulation form of a combination of an IPv6/SRv6 label and the MPLS label differs greatly from an encapsulation form in an existing SRv6-VPN solution.

2. The BFIR-ID needs to be configured on the head node. Deploying inter-domain BIER IPv6 multicast in is especially difficult because the head node and the tail node need to be configured in a same BIER sub-domain and a unique BFIR-ID in the sub-domain needs to be configured on the head node. The BIER sub-domain is usually in an IGP domain, so that the unique BFIR-ID in the domain can be easily configured. One of difficulties in configuring the head node and the tail node to be in a same sub-domain and have different BRF-IDs in inter-IGP domain is how to avoid generating a configuration conflict.

To resolve the problem existing in the foregoing BIER packet forwarding method, the embodiments provides a packet forwarding method, a packet sending apparatus, and a packet receiving apparatus, to improve packet sending performance.

Figure 4:
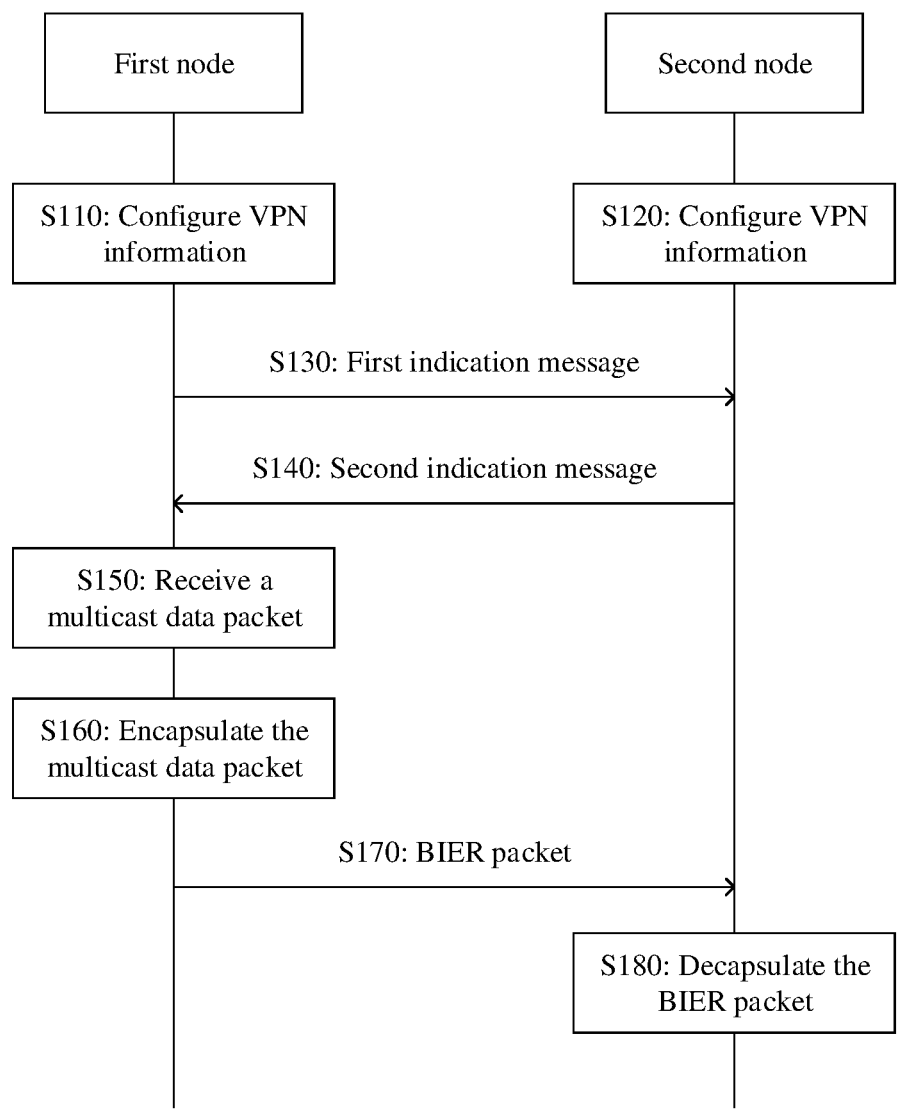
FIG. 4 is a schematic diagram of a packet forwarding method according to an embodiment.

With reference to FIG. 4, the following describes in detail a packet forwarding method provided in an embodiment.

The packet forwarding method provided in this embodiment is applicable to the scenario shown in FIG. 1. For example, the packet forwarding method is applied to a multicast VPN over BIER.

The following describes, in detail from a perspective of interaction between nodes, the packet forwarding method provided in this embodiment.

FIG. 4 is a schematic diagram of a packet forwarding method according to an embodiment. The schematic diagram includes eight steps: S110 to S180. The eight steps are described below in detail.

S110: a first node configures VPN information.

The first node configures a first identifier of a first VPN and a first internet protocol version 6 IPv6 address, where the first VPN is any one of a plurality of VPNs, and the first IPv6 address corresponds to the first identifier.

It may be understood that the first node is a node that receives a multicast data packet and that encapsulates the multicast data packet. For example, the BFIR 1 to the BFIR 4 shown in FIG. 1 each may be referred to as the first node, a head node, a first device, a head device, a first network element, a sending network element, or the like.

It should be noted that a multicast VPN refers to a VPN on which multicast is deployed, and VPNs are in a one-to-one correspondence with pieces of VRF. For example, that the first node configures a first identifier of a first VPN may also mean that the first node configures an identifier of first VRF corresponding to the first VPN. In the following descriptions, the identifier of the first VRF is the first identifier. In this case, that the first node configures the first IPv6 address and the identifier of the first VRF corresponding to the first VPN means that the first node needs to configure different VRF identifiers and different IPv6 addresses for a plurality of VPNs.

In this embodiment, descriptions are provided from a perspective of configuring, by the first node, a VRF identifier and an IPv6 address for any VPN. This is of general significance. In addition, the first IPv6 address configured by the first node for the first VPN is referred to as the first IPv6 address of the first node, and is a unique IPv6 address in an entire network.

For example, if three sites A, B, and C are established on a network of an operator, and can support a plurality of customers, each customer has a network of the customer at each of the three sites. Assuming that there are two customers, in an embodiment, one customer has a network of the customer at each of the three sites A, B, and C, and the other customer also has a network of the customer at each of the three sites A, B, and C, there are two VPNs, and each VPN has three sites A, B, and C. Then, at the site A, an identifier of VRF 1 and IPv6 Addr 1 need to be allocated to a VPN 1, and an identifier of VRF 2 and IPv6 Addr 2 need to be allocated to a VPN 2. IPv6 Addr is an IPv6 address.

It should be noted that that the first IPv6 address corresponds to the identifier of the first VRF means that a plurality of IPv6 addresses are in a one-to-one correspondence with a plurality of VRF identifiers. Because a VRF identifier is used to identify VRF, that the plurality of IPv6 addresses are in a one-to-one correspondence with the plurality of VRF identifiers may also mean that a plurality of IPv6 addresses are in a one-to-one correspondence with a plurality of pieces of VRF, and different pieces of VRF are in a one-to-one correspondence with different IPv6 addresses. In other words, the first node has determined IPv6 addresses corresponding to different pieces of VRF in the first node.

The first node may further configure preset configuration information. For example, the first node may configure a packet forwarding path. Details are as follows:

The preset configuration information includes a correspondence between an IPv6 address of a proxy node and an IPv6 address of a second node, and indicates that a packet is forwarded to the second node through the proxy node. The correspondence between the IPv6 address of the proxy node and the IPv6 address of the second node may be a one-to-one correspondence between IPv6 addresses of proxy nodes and IPv6 addresses of second nodes, or a one-to-many correspondence between IPv6 addresses of proxy nodes and IPv6 addresses of a plurality of second nodes. It may be understood that the proxy node may forward a BIER packet to a plurality of second nodes.

It may be understood that the second node is a node that receives the BIER packet. For example, the BFER 1 to the BFER 4 shown in FIG. 1 each may be referred to as the second node, a tail node, a leaf node, a second device, a tail device, a second network element, a receiving network element, or the like.

Alternatively, the preset configuration information includes a correspondence between an IPv6 address of a second node, an IPv6 address of a specified node, and an IPv6 address of a proxy node, and indicates that the BIER packet is forwarded to the proxy node through the specified node and then forwarded to the second node through the proxy node.

In other words, the first node may configure related preset configuration information on a control plane, to indicate a packet forwarding path.

S120: the second node configures VPN information.

The second node configures a second identifier of the first VPN, a second IPv6 address, and an identifier of the second node, where the first VPN is any one of a plurality of VPNs.

It should be noted that as described above, the VPNs are in a one-to-one correspondence with the pieces of VRF. For example, that the second node configures a second identifier of a first VPN may also mean that the second node configures an identifier of a second VRF corresponding to the first VPN. In the following descriptions, the identifier of the second VRF is the second identifier.

With reference to the information that is about the first VPN and that is configured by the first node in S110, it may be understood that before packet forwarding, the first node and the second node respectively configure, for a plurality of VPNs, VRF identifiers and IPv6 addresses that correspond to the plurality of VPNs.

For example, there are a total of two VPNs (a VPN #1 and a VPN #2). The first node configures an identifier of VRF #1 and an IPv6 address #1 for a VPN #1, where the IPv6 address #1 corresponds to the identifier of the VRF #1. The second node configures an identifier of VRF #1' and an IPv6 address #1' for the VPN #1, where the IPv6 address #1' optionally corresponds to the identifier of the VRF #1'. The first node configures an identifier of VRF #2 and an IPv6 address #2 for a VPN #2, where the IPv6 address #2 corresponds to the identifier of the VRF #2. The second node configures an identifier of VRF #2' and an IPv6 address #2' for the VPN #2, where the IPv6 address #2' optionally corresponds to the identifier of the VRF #2'.

Optionally, in some embodiments, the identifier of the second node may be the foregoing BFR-ID, namely, a BFR-ID configured for the second node in an IGP domain to which the second node belongs. Further, because the second node is a node that decapsulates the packet, the BFR-ID configured for the second node is a BFER-ID.

Optionally, in some other embodiments, the identifier of the second node may be information that satisfies a one-to-one correspondence with the BFR-ID. In other words, the BFR-ID can be uniquely determined based on the information and the correspondence. Alternatively, the identifier of the second node may be other information that can identify the second node. Details are not described herein.

S130: the first node sends a first indication message to the second node.

The first indication message is used to indicate the second node to establish a correspondence between the first IPv6 address and the second identifier, the first indication message includes the first identifier of the first VPN and the first IPv6 address, and the second identifier is an identifier that is of the second node and that satisfies a preset correspondence with the first identifier.

It may be understood that the second node establishes the correspondence between the first IPv6 address and the second identifier, to determine, after a packet is received, a local interface that corresponds to VRF and to which the packet is to be sent. Therefore, the one-to-one correspondence between the first IPv6 address and the identifier of the second VRF may be understood as a one-to-one correspondence between the first IPv6 address and the second VRF. In addition, the correspondence between the first IPv6 address and the second identifier is a one-to-one correspondence. For example, the unique second identifier can be learned of based on the first IPv6 address.

The second identifier and the first identifier may satisfy the preset correspondence in any one of the following possible cases:

Possible case 1: the second VRF is VRF that corresponds to the second node and that has a same identifier as the first VRF. For example, if the identifier of the first VRF is "1:1", the second VRF is VRF that corresponds to the second node and whose identifier is "1:1".

Possible case 2: the second VRF is VRF that corresponds to the second node and that satisfies an inclusion relationship with the identifier of the first VRF. For example, if the identifier of the first VRF is "1:1", the second VRF is VRF that corresponds to the second node and whose identifier is "1:1 and 1:2". That the identifiers satisfy the inclusion relationship means that the identifier of the second VRF is an identifier list including a plurality of identifiers, and the identifier of the first VRF is an identifier belonging to an identifier list corresponding to the second VRF, or the identifier of the first VRF is an identifier in another identifier list, where the identifier list is a part or all of the identifier list of the second VRF.

Alternatively, the identifier of the second VRF and the identifier of the first VRF has another preset correspondence.

It may be understood that in this embodiment, the first identifier carried in the first indication message can be used to determine the second identifier. The second identifier is determined by using a preset correspondence.

After receiving the first indication message, that the second node determines the correspondence between the first IPv6 address and the second VRF based on the first indication message and locally configured information includes:

First, the second node determines the second VRF based on the identifier that is of the first VRF and that is carried in the first indication message and the locally stored preset correspondence between the identifier of the first VRF and the identifier of the second VRF. For example, the second node may determine, as the second VRF, the VRF that corresponds to the second node and that has the same identifier as the first VRF, or determine, as the second VRF, the VRF that corresponds to the second node and whose VRF identifier includes the identifier of the first VRF. It may be understood that the preset correspondence between the identifier of the first VRF and the identifier of the second VRF may be preset by a system, or may be agreed on by the first node and the second node. Only a case in which the second node can determine the second VRF from the second node after learning of the identifier of the first VRF needs to be ensured.

Then, the first indication message further carries the first IPv6 address, and the first IPv6 address corresponds to the identifier of the first VRF on the first node side. After determining the second VRF, the second node can further determine the correspondence between the first IPv6 address and the second VRF.

Optionally, in some embodiments, the first indication message is a BGP-MVPN route message. The first IPv6 address and the first identifier are encapsulated in the BGP-MVPN route message.

That the first IPv6 address and the first identifier are encapsulated in the BGP-MVPN route message may be: the first identifier is <route target extended community attribute>, and the first IPv6 address is <first node Addr 1>. Herein, <first node Addr 1> may be carried in an MP_REACH_NLRI attribute, a PTA attribute, or another newly added attribute of the BGP-MVPN route message.

Optionally, in some other embodiments, the first indication message is a BGP-VPN route message. The first IPv6 address and the first identifier are encapsulated in the BGP-VPN route message.

That the first IPv6 address and the information of the first VRF are encapsulated in the BGP-VPN route message may be: the first identifier is <route target extended community attribute>, and the first IPv6 address is <first node Addr 1>. Herein, <first node Addr 1> may be carried in an SRv6-VPN SID TLV in a BGP-prefix SID attribute of the BGP-VPN route message.

Optionally, in some other embodiments, the first indication message is a BGP-EVPN route message. The first IPv6 address and the first identifier are encapsulated in the BGP-EVPN route message.

That the first IPv6 address and the first identifier are encapsulated in the BGP-EVPN route message may be: the first identifier is <route target extended community attribute>, and the first IPv6 address is <first node Addr 1>. Herein, <first node Addr 1> may be carried in an attribute of the BGP-EVPN route message.

Alternatively, the first indication message may be another message. Details are not described herein.

It may be understood that FIG. 4 further include a S140. Thus, the second node sends a second indication message to the first node.

The second indication message is used to indicate that the second node is a receiver of the multicast data packet, and the second indication message may be understood as a multicast join packet. The second indication message includes an IPv6 address of the second node, and the IPv6 address of the second node and the local preset configuration information of the first node can be used to determine a packet forwarding path.

The second indication message further includes a source address, a group address, and an identifier of the second node. The source address is an address of a multicast source that needs to be received by the second node, and the group address is an address of a multicast group that the second node joins.

Optionally, in some embodiments, when the first node belongs to a first IGP domain, the second node belongs to a second IGP domain, and the first IGP domain is different from the second IGP domain, the second indication message may further include an IPv6 address of a proxy node. For example, the proxy node belongs to the second IGP domain.

It may be understood that the proxy node may be an edge node or an intermediate node in the second IGP domain, or may be referred to as a proxy device, a packet forwarding node, or the like.

In this case, the second indication message can indicate that the to-be-forwarded BIER packet is forwarded to the second node through the proxy node.

Optionally, in some embodiments, when the first node belongs to a first IGP domain, the second node belongs to a second IGP domain, and the first IGP domain is different from the second IGP domain, the second indication message further includes the second IPv6 address described in S120.

In this case, the second indication message and the preset configuration information configured on the first node can indicate that the to-be-forwarded BIER packet is forwarded to a tail node through the proxy node, and the preset configuration information includes a correspondence between the second IPv6 address and the IPv6 address of the proxy node.

Optionally, in some embodiments, the preset configuration information may further indicate that the to-be-forwarded BIER packet needs to arrive at the proxy node after passing through a specified node. The specified node is a node through which the BIER packet needs to pass before arriving at the proxy node. For example, the specified node may be an edge node or an intermediate node in the first IGP domain.

It may be understood that names such as the first node, the second node, the proxy node, and the specified node are defined for ease of differentiation. A possibility that other names are used to replace the foregoing names in an existing protocol or a future protocol is not excluded.

Optionally, in some embodiments, the second indication message is a BGP-MVPN route message.

S110 to S140 mainly describe information exchange between the first node and the second node and the correspondence established by the second node on the control plane. The following describes, in detail with reference to S150 to S180 in FIG. 4, processes of encapsulating the BIER packet, forwarding the BIER packet, and decapsulating the BIER packet.

S150: the first node receives a multicast data packet.

The multicast data packet carries a source address of the multicast data packet and a group address of the multicast data packet. For example, the first node can determine, based on an interface on which the multicast data packet is received, VRF to which the multicast data packet belongs. For clear descriptions and to keep consistency of a control plane with the foregoing control plane, it is assumed that the multicast data packet belongs to the first VRF. In other words, the multicast data packet belongs to the first VPN.

S160: the first node encapsulates the multicast data packet.

First, the first node determines, based on S150 in which the first VPN to which the multicast data packet belongs and S110 in which the first identifier of the first VPN and the first IPv6 address are configured, that the multicast data packet corresponds to the first IPv6 address. Because the first identifier corresponds to the first IPv6 address, the first node can obtain the first IPv6 address.

Then, the first node encapsulates the multicast data packet based on the obtained first IPv6 address, to obtain a to-be-forwarded BIER packet. The to-be-forwarded BIER packet includes an outer IPv6 header, preset information indicating the second node, an inner IPv6 or IPv4 header, and a payload. The preset information indicating the second node may be the foregoing bitstring information, and the second node can be determined based on the bitstring information.

Figure 5A:
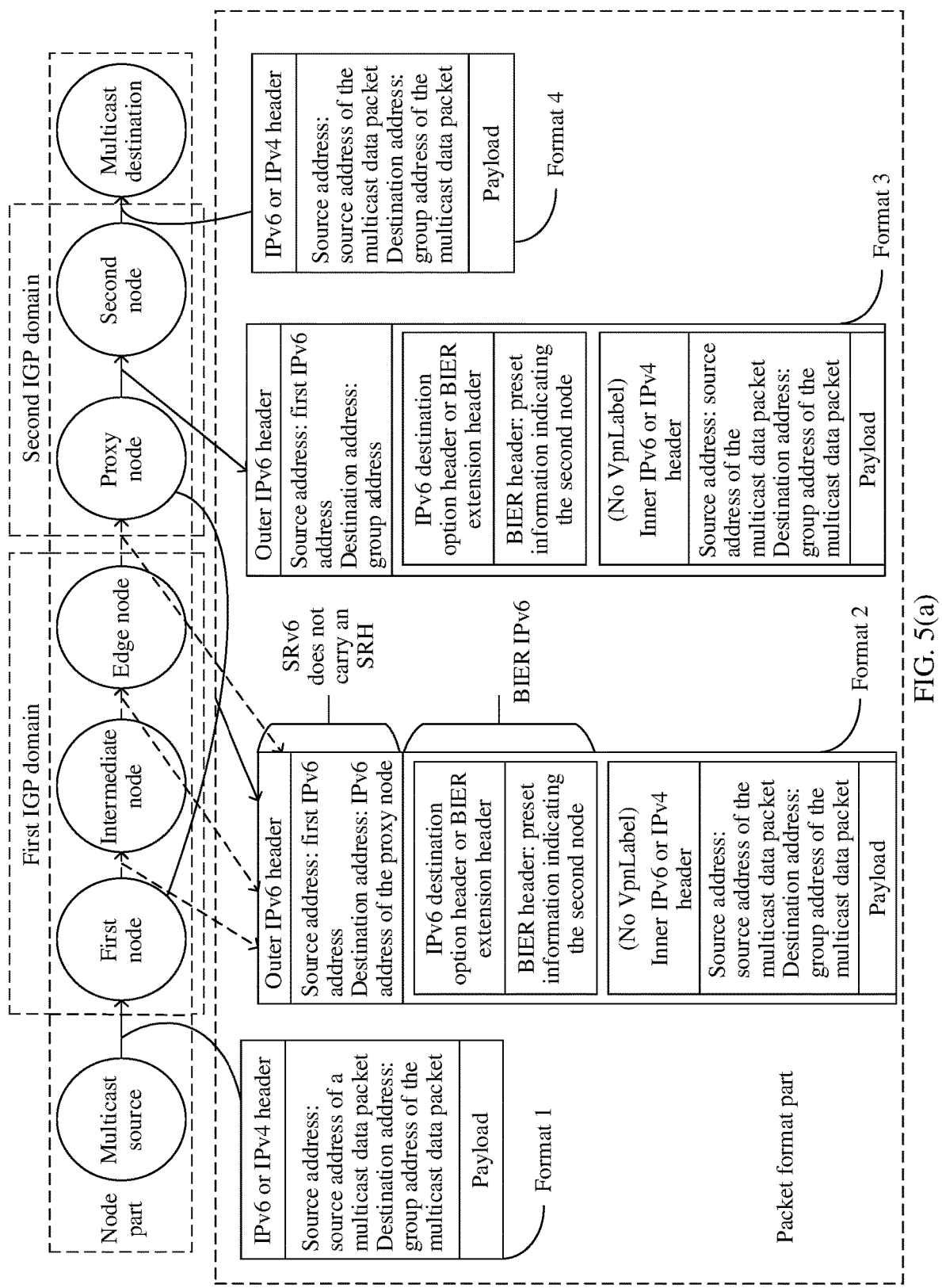
FIG. 5(a) is a schematic diagram of a format of a BIER packet encapsulated by a first node according to an embodiment.
Figure 5B:
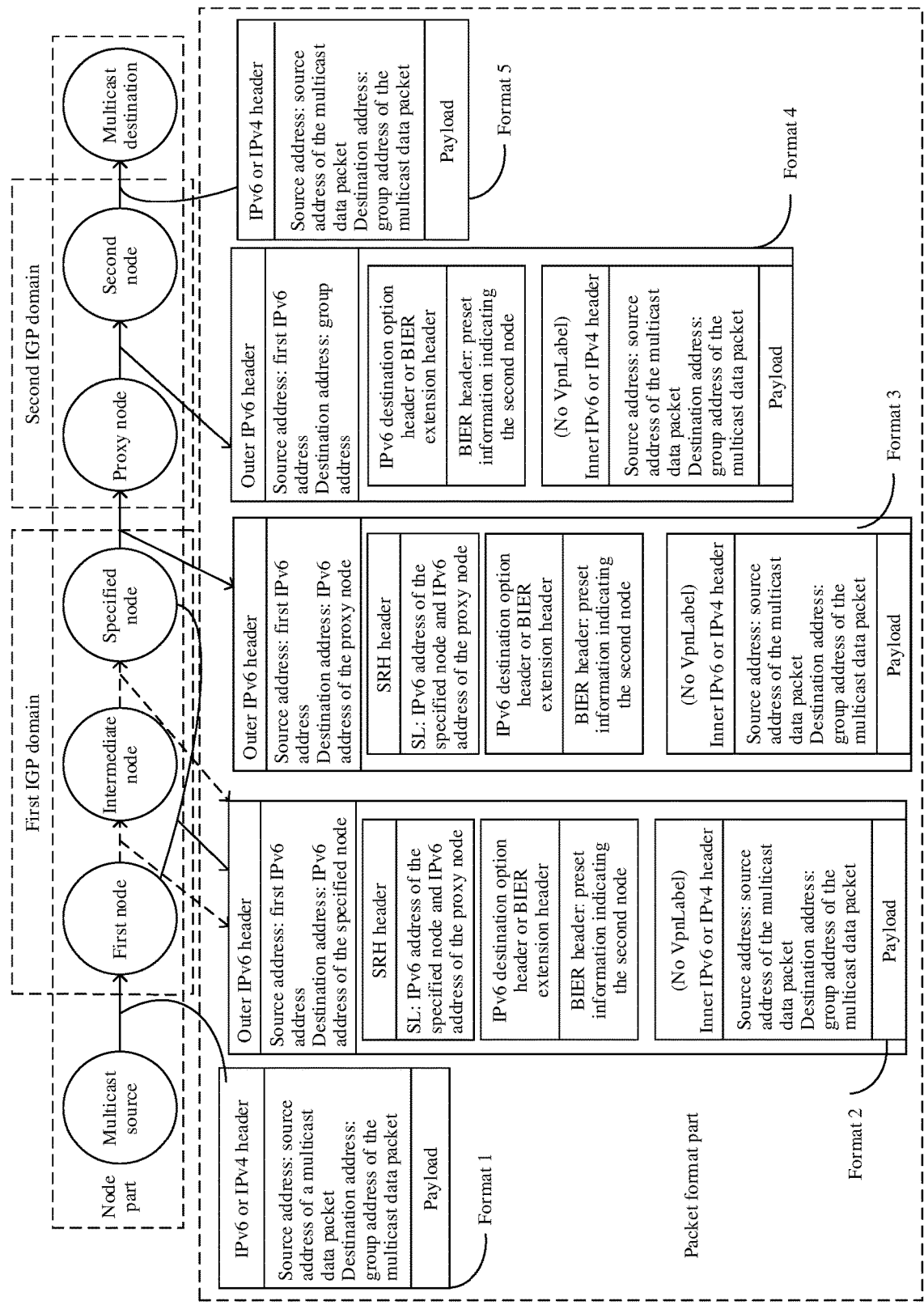
FIG. 5(b) is a schematic diagram of a format of a BIER packet encapsulated by a first node according to an embodiment.
Figure 5C:
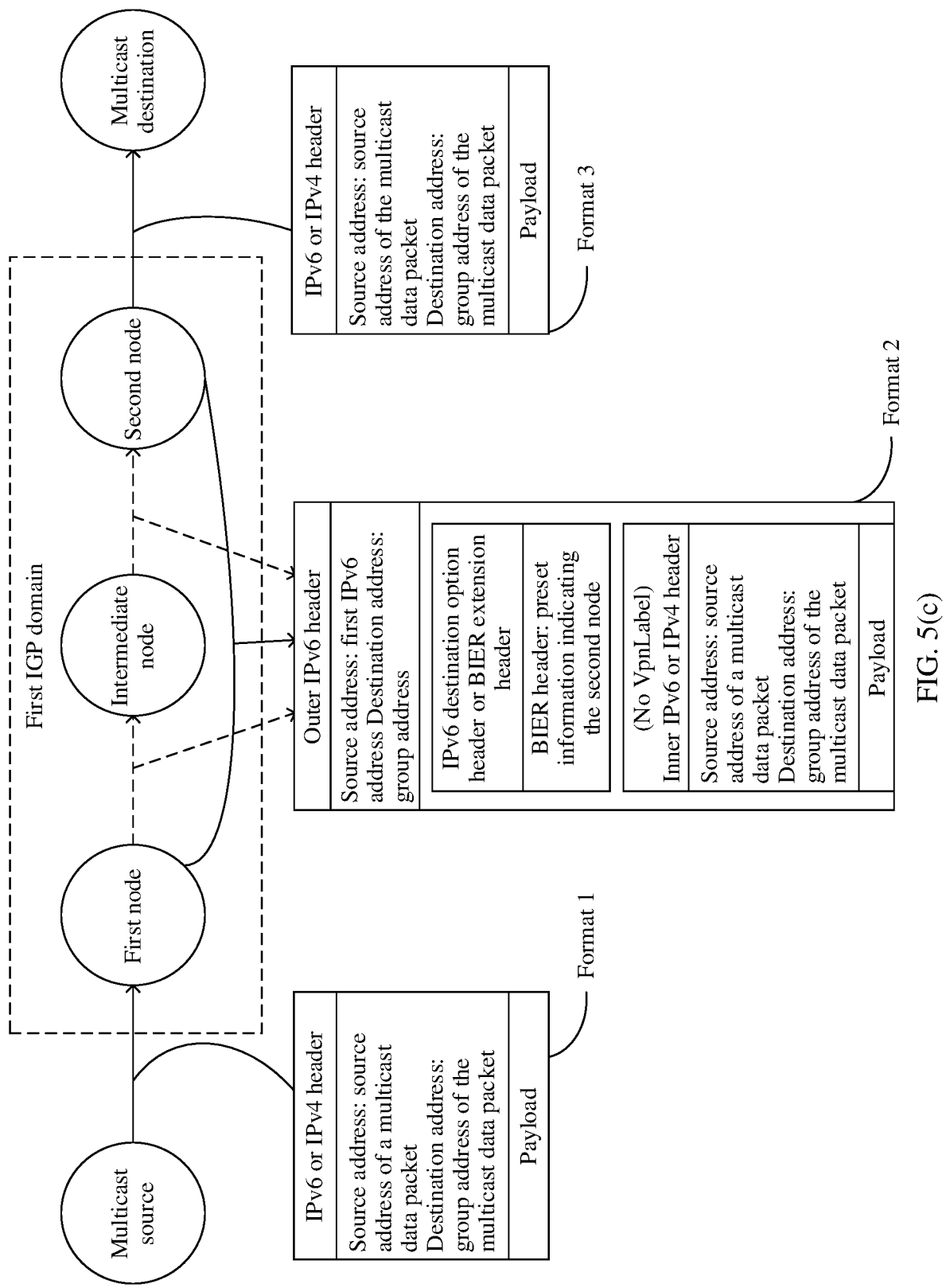
FIG. 5(c) is a schematic diagram of a format of a BIER packet encapsulated by a first node according to an embodiment.

The following describes, in detail with reference to FIG. 5(a) to FIG. 5(c), how the first node encapsulates the multicast data packet. FIG. 5(a) to FIG. 5(c) each are a schematic diagram of a packet format according to an embodiment.

It may be understood that the first node can determine, based on the received second indication message sent by the second node in S140, that the multicast data packet needs to be sent to the second node. The address that is of the multicast source and that is included in the multicast data packet is the address of the multicast source that needs to be received by the second node, the address that is of the multicast group and that is included in the multicast data packet is the address of the multicast group that the second node joins, and the second indication message sent by the second node includes the address of the multicast source that needs to be received by the second node and the address of the multicast group that the second node joins. Therefore, the first node determines that the multicast data packet needs to be sent to the second node, and further encapsulates the received multicast data packet.

That the first node encapsulates the multicast data packet includes the following several cases:

Case 1:

The first node and the second node belong to different IGP domains. For example, as described in S140 in FIG. 4, the first node belongs to the first IGP domain, the second node belongs to the second IGP domain, and the first IGP domain is different from the second IGP domain. The BIER packet obtained by encapsulating the multicast data packet by the first node needs to be forwarded to the second node through the proxy node.

In this case, a specific packet format of the BIER packet obtained by the first node through encapsulation is shown in FIG. 5(a). The schematic diagram includes two parts (the node part and the packet format part shown in FIG. 5(a)). The following describes, in detail with reference to FIG.

5(a), how the first node encapsulates the multicast data packet to obtain the to-be-forwarded BIER packet.

First, the first node receives a multicast data packet from a multicast source. A format of the multicast data packet (shown as Format 1 in FIG. 5(a)) includes an IPv6 or IPv4 header (if the multicast data packet is an IPv6 packet, the format includes the IPv6 header; or if the multicast data packet is an IPv4 packet, the format includes the IPv4 header), a source address of the IPv6 or IPv4 header and a destination address of the IPv6 or IPv4 header, and finally a packet payload, where the source address of the IPv6 or IPv4 header is the source address of the multicast data packet and the destination address of the IPv6 or IPv4 header is the group address of the multicast data packet.

Then, that the first node encapsulates the multicast data packet to obtain the to-be-forwarded BIER packet includes:

The first node encapsulates the IPv6 header at an outer layer of the multicast data packet, where the IPv6 header is an outermost IPv6 header of the BIER packet and may be referred to as an outer IPv6 header. In the following descriptions, that the first node encapsulates the IPv6 header at the outer layer of the multicast data packet means that the first node encapsulates the outer IPv6 header.

The source address carried in the outer IPv6 header is the first IPv6 address in S110, and the destination address is the IPv6 address of the proxy node. The IPv6 address of the proxy node may be carried in the second indication message sent by the second node to the first node, or may be locally configured by the first node. Details are described in S140, and therefore not described herein again.

The first node encapsulates an IPv6 destination option header at an outer layer of the multicast data packet, where the IPv6 destination option header includes a BIER header, and the BIER header carries preset information indicating the second node. Alternatively, the first node encapsulates a BIER extension header at an outer layer of the multicast data packet, where the BIER extension header carries preset information indicating the second node.

That the first node encapsulates an IPv6 destination option header, where the IPv6 destination option header includes a BIER header may mean that no new IPv6 extension header is defined, and the IPv6 destination option header is further extended. The encapsulating a BIER extension header may be understood as defining a new IPv6 extension header and using the new IPv6 extension header to carry information required by the BIER packet. An existing extension header may be further extended, or a new extension header may be defined.

The first node encapsulates an inner IPv6 or IPv4 header, where a source address carried in the inner IPv6 or IPv4 header is the source address of the multicast data packet, and a destination address carried in the inner IPv6 or IPv4 header is the group address of the multicast data packet.

Finally, the first node uses a payload of the multicast data packet as a payload of the to-be-forwarded BIER packet, in other words, uses an IP packet of an original multicast data packet as a payload of the to-be forwarded BIER packet.

The first node does not need to encapsulate a VpnLabel in a process of encapsulating the multicast data packet. Compared with a BIER packet forwarding method in the conventional technology, on a control plane, the first node does not need to configure or generate a VpnLabel field, and sends information about the VpnLabel field to the second node. Further, the first node does not need to encapsulate the VpnLabel field on a forwarding plane.

It may be understood that in the process of encapsulating the multicast data packet in Case 1, the first node encapsulates the inner IPv6 or IPv4 header and the payload of the to-be forwarded BIER packet. It can be understood by comparing Format 1 in FIG. 5(a) and Format 2 in FIG. 5(a) that the encapsulation is actually encapsulating the received multicast data packet in the to-be-forwarded BIER packet. Further, the first node encapsulates the outer IPv6 header and the IPv6 extension header or the BIER extension header at the outer layer of the multicast data packet.

The first node encapsulates the multicast data packet, and obtains the to-be-forwarded BIER packet in a format (shown as Format 2 in FIG. 5(a)). Before arriving at the proxy node, the to-be-forwarded BIER packet may be further forwarded through another node in the first IGP domain. However, in Case 1, when the to-be-forwarded BIER packet is forwarded through the intermediate node or the edge node in the first IGP domain, the packet format does not change. As shown by dashed lines between the first node, the intermediate node, and the edge node in FIG. 5(a), when the packet is forwarded through the intermediate node and the edge node, a packet format is the packet format obtained after encapsulation performed by the first node (a dashed line pointing to Format 2 of the packet in FIG. 5(a) indicates that the packet format remains a form shown as Format 2).

Further, in Case 1, after receiving the BIER packet, the proxy node needs to change the destination address of the outer IPv6 header of the BIER packet from a unicast address (the IPv6 address of the proxy node in Format 2 shown in FIG. 5(a)) to a multicast group address. A concept of the multicast group address is different from the group address of the multicast data packet, and is briefly explained as follows:

The multicast group address is planned for a network of an operator, and the group address of the multicast data packet is private to a customer. Here, the multicast group address is an IPv6 address, and the group address of the multicast data packet may be an IPv6 or IPv4 address.

Case 2:

The first node and the second node belong to different IGP domains. For example, as described in S140 in FIG. 4, the first node belongs to the first IGP domain, the second node belongs to the second IGP domain, and the first IGP domain is different from the second IGP domain. The BIER packet obtained by encapsulating the multicast data packet by the first node needs to be forwarded to the second node through the proxy node and the specified node. The specified node in S140 in FIG. 4 belongs to the first IGP domain.

In this case, a specific packet format of the BIER packet obtained by the first node through encapsulation is shown in FIG. 5(b). The schematic diagram includes two parts (the node part and the packet format part shown in FIG. 5(b)). The following describes, in detail with reference to FIG. 5(b), how the first node encapsulates the multicast data packet to obtain the to-be-forwarded BIER packet.

First, the first node receives a multicast data packet from a multicast source. A format of the multicast data packet (shown as Format 1 in FIG. 5(b)) includes an IPv6 or IPv4 header (if the multicast data packet is an IPv6 packet, the format includes the IPv6 header; or if the multicast data packet is an IPv4 packet, the format includes the IPv4 header), a source address of the IPv6 or IPv4 header and a destination address of the IPv6 or IPv4 header, and finally a packet payload, where the source address of the IPv6 or IPv4 header is the source address of the multicast data packet and the destination address of the IPv6 or IPv4 header is the group address of the multicast data packet.

Then, that the first node encapsulates the multicast data packet to obtain the to-be-forwarded BIER packet includes:

The first node encapsulates an outer IPv6 header at an outer layer of an SRH, where a source address carried in the outer IPv6 header is the first IPv6 address in S110, and a destination address carried in the outer IPv6 header is the IPv6 address of the specified node. The IPv6 address information of the specified node is indicated by the preset configuration information configured by the first node.

The first node encapsulates an SRH at an outer layer of the multicast data packet, where an address list (SID list, SL) carried in the SRH includes the IPv6 address of the specified node and the IPv6 address of the proxy node.

It may be understood that the address list carried in the SRH may further include an address other than the IPv6 address of the specified node and the IPv6 address of the proxy node.

The first node encapsulates an IPv6 destination option header, where the IPv6 destination option header includes a BIER header, and the BIER header carries preset information indicating the second node. Alternatively, the first node encapsulates a BIER extension header, where the BIER extension header carries preset information indicating the second node.

The first node encapsulates an inner IPv6 or IPv4 header, where a source address carried in the inner IPv6 or IPv4 header is the source address of the multicast data packet, and a destination address carried in the inner IPv6 or IPv4 header is the group address of the multicast data packet.

Finally, the first node uses a payload of the multicast data packet as a payload of the to-be-forwarded BIER packet, in other words, uses an IP packet of an original multicast data packet as a payload of the to-be forwarded BIER packet.

It may be understood that in the process of encapsulating the multicast data packet in Case 2, the first node encapsulates the inner IPv6 or IPv4 header and the payload of the to-be forwarded BIER packet. It can be understood by comparing Format 1 in FIG. 5(b) and Format 2 in FIG. 5(b) that the encapsulation is actually encapsulating the received multicast data packet in the to-be-forwarded BIER packet. Further, the first node encapsulates the IPv6 extension header or the BIER extension header at the outer layer of the multicast data packet, then encapsulates the SRH outside the IPv6 destination option header or the BIER extension header, and finally encapsulates the outer IPv6 header at the outer layer of the SRH.

The first node encapsulates the multicast data packet, and obtains the to-be-forwarded BIER packet in a format (shown as Format 2 in FIG. 5(b)). Before arriving at the specified node, the to-be-forwarded BIER packet may be further forwarded through another node in the first IGP domain. However, in Case 2, when the to-be-forwarded BIER packet is forwarded to the specified node through the intermediate node or the edge node in the first IGP domain, the packet format does not change. As shown by a dashed line between the first node and the intermediate node in FIG. 5(b), when the packet is forwarded through the intermediate node, a packet format is the packet format obtained after encapsulation performed by the first node (a dashed line pointing to Format 2 of the packet in FIG. 5(b) indicates that the packet format remains a form shown as Format 2).

Further, in Case 2, after the specified node receives the BIER packet, the specified node changes the destination address of the outer IPv6 header from the IPv6 address of the specified node to the IPv6 address of the proxy node based on the address list carried in the SRH. After receiving the BIER packet from the specified node, the proxy node needs to change the destination address of the outer IPv6 header of the BIER packet from a unicast address (the IPv6 address of the proxy node in Format 3 shown in FIG. 5(b)) to a multicast group address.

It may be further understood that in Case 2, after receiving the BIER packet, the proxy node or the specified node needs to remove the SRH. Here, the removing the SRH includes:

The SRH includes an address list placed in sequence, and a pointer is used to indicate which address in the address list is currently reached. When the packet arrives at a node, the pointer moves (which is understood as subtracting 1 from a pointer value). For example, the IPv6 address of the specified node is encapsulated in the IPv6 header of the to-be-forwarded BIER packet, the address list encapsulated in the SRH includes the IPv6 address of the specified node and the IPv6 address of the proxy node, and the pointer value is 1. In this case, when the packet arrives at the specified node, the pointer moves to 0 and the specified node may not pop up the SRH. When the packet arrives at the proxy node, the pointer is 0 and the SRH is removed. Alternatively, when the packet arrives at the specified node, after the pointer moves to 0, the specified node removes the SRH. In this case, the proxy node no longer needs to remove the SRH.

Case 3:

The first node and the second node belong to a same IGP domain.

In this case, a specific packet format of the BIER packet obtained by the first node through encapsulation is shown in FIG. 5(c). The schematic diagram includes two parts (the node part and the packet format part shown in FIG. 5(c)). The following describes, in detail with reference to FIG. 5(c), how the first node encapsulates the multicast data packet to obtain the to-be-forwarded BIER packet.

First, the first node receives a multicast data packet from a multicast source. A format of the multicast data packet (shown as Format 1 in FIG. 5(c)) includes an IPv6 or IPv4 header (if the multicast data packet is an IPv6 packet, the format includes the IPv6 header; or if the multicast data packet is an IPv4 packet, the format includes the IPv4 header), a source address of the IPv6 or IPv4 header and a destination address of the IPv6 or IPv4 header, and finally a packet payload, where the source address of the IPv6 or IPv4 header is the source address of the multicast data packet and the destination address of the IPv6 or IPv4 header is the group address of the multicast data packet.

Then, that the first node encapsulates the multicast data packet to obtain the to-be-forwarded BIER packet includes:

The first node encapsulates an outer IPv6 header, where a source address carried in the outer IPv6 header is the first IPv6 address in S110, and a destination address carried in the outer IPv6 header is the group address.

The first node encapsulates an IPv6 destination option header, where the IPv6 destination option header includes a BIER header, and the BIER header carries preset information indicating the second node. Alternatively, the first node encapsulates a BIER extension header, where the BIER extension header carries preset information indicating the second node.

The first node encapsulates an inner IPv6 or IPv4 header, where a source address carried in the inner IPv6 or IPv4 header is the source address of the multicast data packet, and a destination address carried in the inner IPv6 or IPv4 header is the group address of the multicast data packet.

Finally, the first node uses a payload of the multicast data packet as a payload of the to-be-forwarded BIER packet, in other words, uses an IP packet of an original multicast data packet as a payload of the to-be forwarded BIER packet.

The first node encapsulates the multicast data packet, and obtains the to-be-forwarded BIER packet in a format (shown as Format 2 in FIG. 5(c)). Before arriving at the second node, the to-be-forwarded BIER packet may be further forwarded through another node in the first IGP domain. However, in Case 3, when the to-be-forwarded BIER packet is forwarded through the another node in the first IGP domain, the packet format does not change. As shown by dashed lines between the first node, the intermediate node, and the edge node in FIG. 5(c), when the packet is forwarded through the intermediate node and the edge node, a packet format is the packet format obtained after encapsulation performed by the first node (a dashed line pointing to Format 2 of the packet in FIG. 5(c) indicates that the packet format remains a form shown as Format 2).

S170: the first node sends the BIER packet to the second node.

The following three cases are included.

Case 1:

Corresponding to Case 1 in S160, the first node sends the to-be-forwarded BIER packet to the second node based on the outer IPv6 header through the proxy node. It may be understood that the intermediate node in the IGP domain is not described in detail, and an actual packet forwarding procedure optionally further includes forwarding through the intermediate node.

Case 2:

Corresponding to Case 2 in S160, the first node sends the to-be-forwarded BIER packet to the second node based on the SRH and the outer IPv6 header through the specified node and the proxy node. The to-be-forwarded BIER packet is forwarded to the proxy node through the specified node and then forwarded to the second node through the proxy node.

Case 3:

Corresponding to Case 3 in S160, the to-be-forwarded BIER packet is directly sent by the first node to the second node without passing through the proxy node and the specified node.

S180: the second node decapsulates the BIER packet.

The second node obtains the preset information carried in the BIER header, where the preset information indicates the second node. In other words, the second node learns that the packet is sent to the second node.

The second node determines, based on the preset information, to decapsulate the BIER packet.

The second node determines, based on the first IPv6 address carried in the outer IPv6 header of the BIER packet and the correspondence that is between the first IPv6 address and the second identifier and that is determined in S110, that the multicast data packet carried in the BIER packet needs to be sent to the interface corresponding to the second VRF.

The second node determines, based on a fact that the source address carried in the inner IPv6 or IPv4 header of the BIER packet is the source address of the multicast data packet and the destination address carried in the inner IPv6 or IPv4 header of the BIER packet is the group address of the multicast data packet, that the multicast data packet is sent on at least one interface corresponding to the second VRF.

After determining that the multicast data packet includes the address of the multicast source and the address of the multicast group, the second node obtains at least one interface corresponding to the second identifier, and sends the multicast data packet through the at least one interface, where the address of the multicast source is the address of the multicast source that needs to be received by the second node, and the address of the multicast group is the address of the multicast group that the second node joins. The address of the multicast source may be referred to as the source address, and the address of the multicast group may be referred to as the group address.

It may be understood that determining that the multicast data packet is sent on at least one interface corresponding to the second VRF includes: determining that the multicast data packet is sent on the at least one interface corresponding to the second identifier. Because the second identifier may be actually understood as an identifier of the second VRF, it may be further determined that the multicast data packet is sent on the at least one interface corresponding to the second VRF.

With reference to FIG. 4 and FIG. 5, the foregoing describes in detail implementations of the packet forwarding method provided in the embodiments on the control plane and the forwarding plane. With reference to the embodiments, the following describes how to use the packet forwarding method during actual BIER packet forwarding.

Nodes in the embodiments and functions of these nodes are shown in the following table.

| Node | Function |
| --- | --- |
| PE 1 | BIER IPv6 function and SRv6 function |
| PE 2 | IPv6 function (directly forwarding a packet based on a destination address <non-local IP address> of an IPv6 header) |
| BR 1 | IPv6 function (directly forwarding a packet based on a destination address <non-local IP address> of an IPv6 header) SRv6 function (re-encapsulating an IPv6 destination address based on a destination address <local IP address> of an IPv6 header) |
| BR 2 | SRv6 function (re-encapsulating an IPv6 destination address as a multicast address based on a destination address <local IP address> of an IPv6 header), where the SRv6 function is very flexible and different actions may be performed based on definition of <local IP address>. The SRv6 function of the BR 2 is to re-encapsulate the IPv6 destination address as a multicast group address. BIERv6 function (reading BIER information in an extension header destination option header based on a fact that an updated IPv6 destination address is a multicast address, and performing replication and forwarding based on the BIER information) |
| P20 | BIERv6 function (reading BIER information in an extension header destination option header based on a fact that an IPv6 destination address is a multicast address, and replicates and forwards a packet based on the BIER information) |
| PE 2 | BIERv6 function (reading BIER information in an extension header destination option header based on the fact that an IPv6 destination address is a multicast address and replicates and forwards a packet based on the BIER information. If it is detected that the packet is sent to itself, the packet is replicated to respective interfaces corresponding to VRF on the local device) |

Figure 6A:
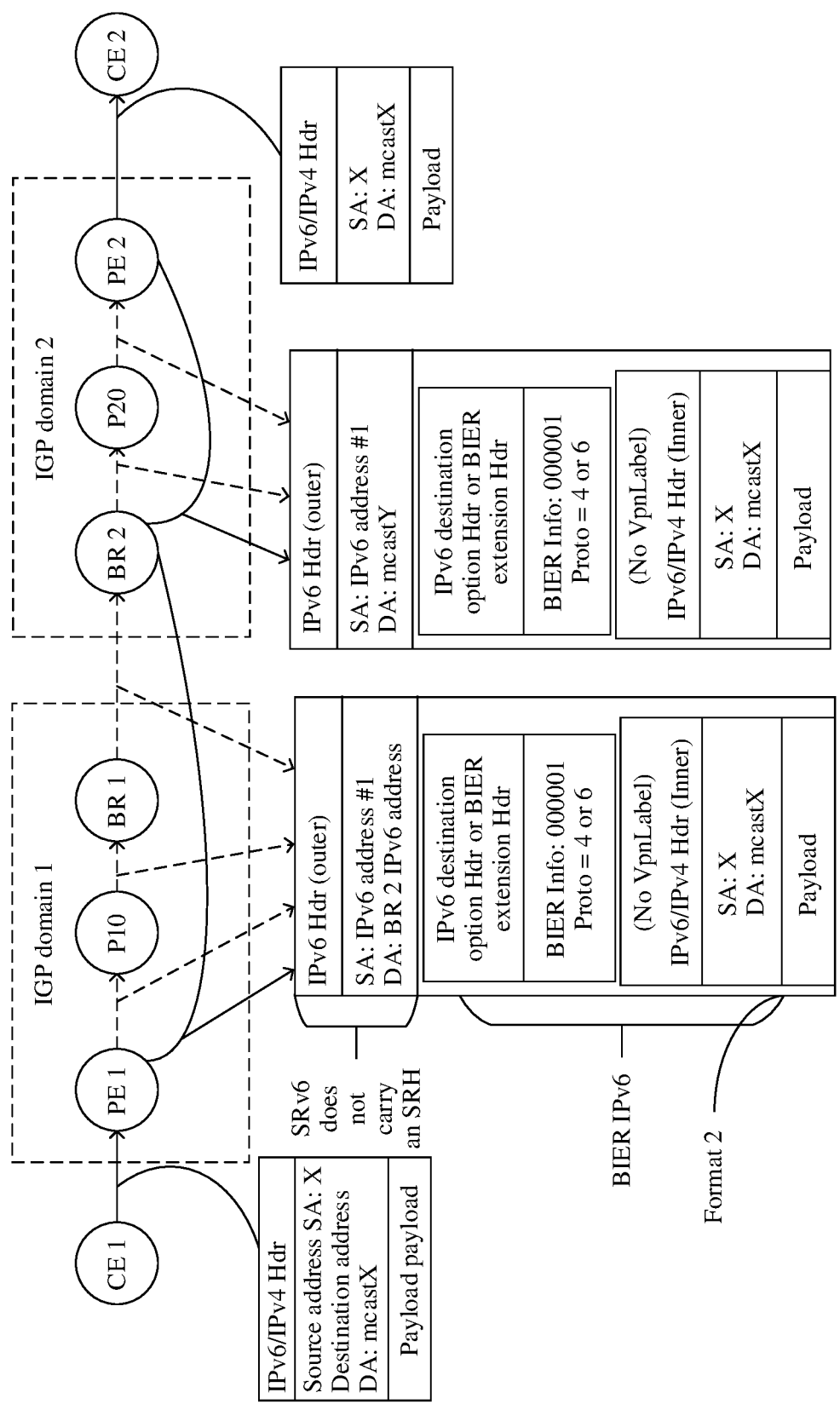
FIG. 6(a) is a schematic diagram of a first embodiment.
Figure 6B:
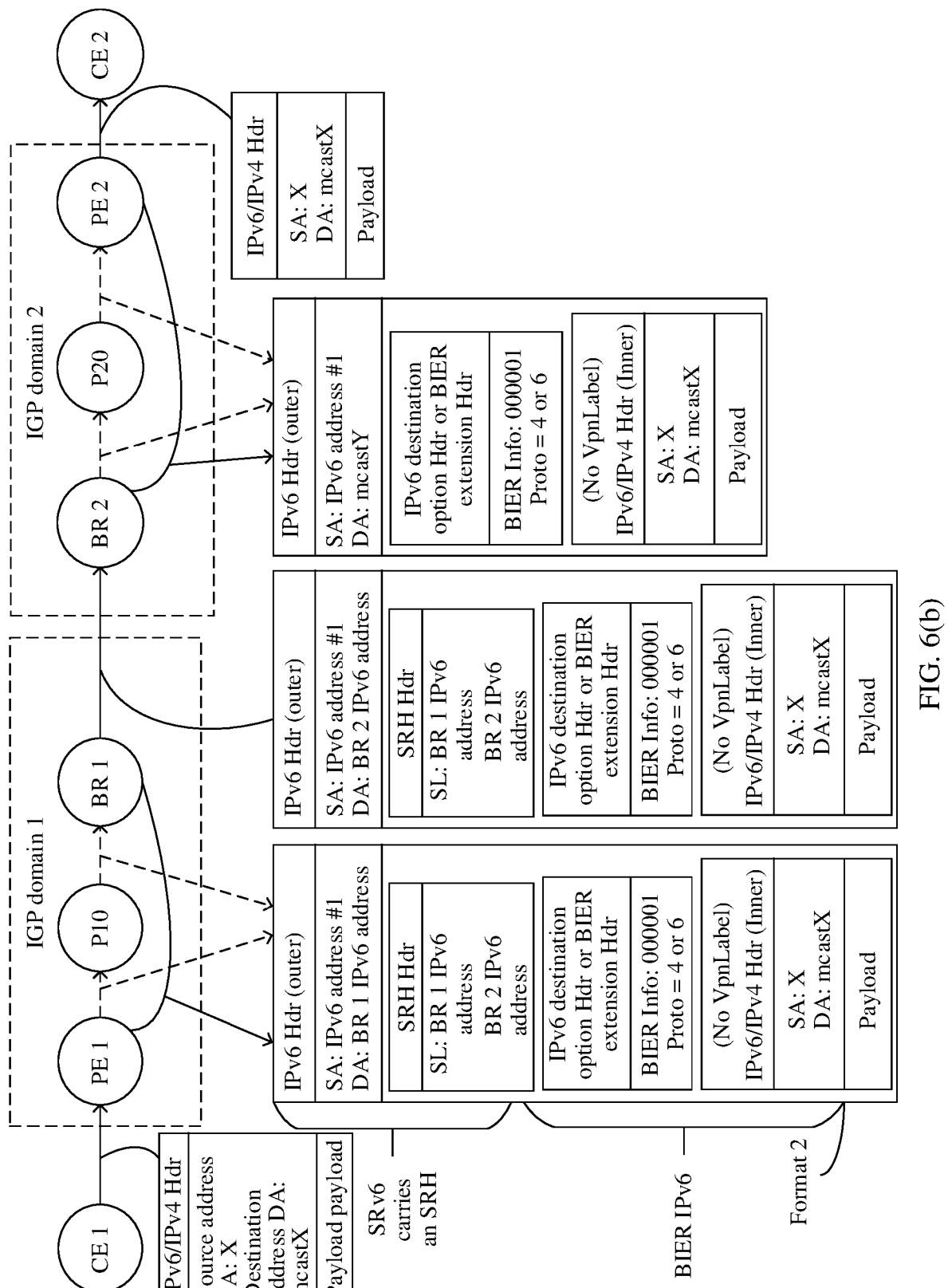
FIG. 6(b) is another schematic diagram of a first embodiment.

FIG. 6(a) and FIG. 6(b) each are a schematic diagram of an embodiment 1. The schematic diagram includes three nodes (for example, a PE 1, P10, and a BR 1 shown in FIG. 6(a) and FIG. 6(b)) that belong to an IGP domain 1, three nodes (for example, a PE 2, P20, and a BR 2 shown in FIG. 6(a) and FIG. 6(b)) that belong to an IGP domain 2, a node CE 1 that is outside the IGP domain 1 and that is connected to the PE 1 in the IGP domain 1, and a node CE 2 that is outside the IGP domain 2 and that is connected to the PE 2 in the IGP domain 2.

In FIG. 6(a) and FIG. 6(b), the CE 1 is a node that needs to forward a multicast data packet and is referred to as a multicast data packet source node and may be, for example, a terminal device or a network device. The PE 1 is a router that supports BIER IPv6 encapsulation. For example, when the PE 1 receives a multicast data packet from the CE 1, the PE 1 can encapsulate an outer IPv6 header and a BIER IPv6 header (namely, an IPv6 destination option header) for the multicast data packet, and optionally encapsulate an SRH for the multicast data packet in some cases.

In FIG. 6, the BR 2 is a router that supports SRv6 and BIER IPv6 forwarding. For example, a destination unicast address carried in the BIER packet obtained after encapsulation is the BR 2, and the destination unicast address is a local segment identifier (SID). The BR 2 can remove the SRH based on the SID and changes the destination address of the IPv6 header into a multicast group address. Further, the BR 2 forwards the BIER packet based on the BIER IPv6 header. The BR 2 detects a BIER TLV in the destination option header based on the multicast group address, and replicates and sends the packet based on bitstring information in the BIER TLV.

The node PE 1 (in a specific form of the first node shown in FIG. 4 and FIG. 5) that encapsulates the multicast data packet belongs to the IGP domain 1, and the node PE 2 (in a specific form of the second node shown in FIG. 4 and FIG. 5) that decapsulates the BIER packet belongs to the IGP domain 2.

It may be noted that the IGP protocol is enabled on an interface in each IGP domain. Nodes (the BR 1 and the BR 2 shown in FIG. 6(a) and FIG. 6(b)) between the two domains are referred to as domain edge nodes. The IGP protocol is not enabled between the domain edge nodes. BIER packet forwarding is established by using the IGP protocol, in other words, the BIER packet forwarding is established in only one IGP domain, and BIER sub-domains are also in a same IGP domain.

Before packet forwarding, the PE 2 needs to establish a correspondence between an IPv6 address and VRF on a control plane, so that when receiving the packet, the PE 2 can determine, based on the correspondence between the IPv6 address and the VRF, specific VRF that is in the PE 2 and to which the received packet belongs, and then determine, based on other information in the packet, a specific interface that corresponds to the VRF and to which the packet is to be sent.

Establishing a correspondence between an IPv6 address and VRF on a control plane mainly includes the following steps.

Step 1: in this embodiment, configure information such as a sub-domain or a BFR-ID only for each node in the IGP domain 2 to which the PE 2 belongs, and skip configuring corresponding information such as a sub-domain or a BFR-ID for each node in the IGP domain 1 to which the PE 1 belongs. It may be understood that in this embodiment, the corresponding information such as the sub-domain or the BFR-ID only needs to be configured for each node in the IGP domain to which the node that decapsulates the packet belongs.

A BIER IPv6 sub-domain may be obtained by dividing the IGP domain 2 to which the PE2 belongs. For example, all nodes in the IGP domain 2 belong to a same sub-domain. A BFR-ID 1 is configured on the PE 2. 000001 in a bitstring of the packet is used to indicate that the packet only needs to be sent to the PE 2. Each node in the sub-domain to which the PE 2 belongs establishes a BIER IPv6 forwarding table. A process in which each node establishes a forwarding table is similar to a prior-art process in which each node in a same sub-domain establishes a forwarding table. Details are not described herein.

Further, an identifier of a VPN #1 and an IPv6 address are configured on the PE 2, and are respectively an identifier of VRF #2 and an IPv6 address #2, where the IPv6 address #2 may also be referred to as an IPv6 address of the PE 2.

Step 2: configure an identifier of a VPN #1 and an IPv6 address on the PE 1, which are respectively an identifier of VRF #1 and an IPv6 address #1, where the IPv6 address #1 corresponds to the identifier of the VRF #1, and the IPv6 address #1 may also be referred to as an IPv6 address of the PE 1. Different VRF identifiers are in a one-to-one correspondence with different IPv6 addresses.

Step 3: the PE 1 sends a first indication message including the identifier of the VRF #1 and the IPv6 address #1 to the PE 2.

Optionally, the PE 1 encapsulates the identifier of VRF #1 and the IPv6 address #1 in a BGP-MVPN route message, and sends the BGP-MVPN route message to the PE 2.

Alternatively, the PE 1 encapsulates the identifier of the VRF #1 and the IPv6 address #1 in a BGP-VPN route message, and sends the BGP-VPN route message to the PE 2.

Alternatively, the PE 1 encapsulates the identifier of the VRF #1 and the IPv6 address #1 in a BGP-EVPN route message, and sends the BGP-EVPN route message to the PE 2.

Step 4: the PE 2 receives the first indication message and establishes the correspondence between the IPv6 address and the local VRF.

For example, the PE 2 receives the BGP-MVPN route message sent by the PE 1, matches the identifier of the VRF #1 in the message sent by the PE 1 with the identifier of the VRF #2 configured on the PE 2, and determines that the message belongs to the VRF #2. Therefore, the PE 2 learns that the IPv6 address corresponds to the VRF #2 of the PE 2. The matching the identifier of the VRF #1 with the identifier of the VRF #2 configured on the PE 2 may be as follows: the identifier of the VRF #1 is consistent with the identifier of the VRF #2. Therefore, the PE 2 determines that the VRF #2 corresponds to the IPv6 address.

When the message received by the PE 2 from the PE 1 is the BGP-MVPN route message, the message includes the identifier <route target extended community attribute> of the VRF #1 of the PE 1 and the IPv6 address <PE 1 Addr 1> of the PE 1.

When the message received by the PE 2 from the PE 1 is the BGP-VPN route message, the message includes the identifier <route target extended community attribute> of the VRF #1 of the PE 1 and the IPv6 address <PE 1 Addr 1> of the PE 1.

The message sent by the PE 1 to the PE 2 carries the IPv6 address <PE 1 Addr 1> of the PE 1.

The IPv6 address <PE 1 Addr 1> of the PE 1 may be carried in an MP_REACH_NLRI attribute, a PTA attribute, or another newly added attribute of the BGP-MVPN route message.

Alternatively, the IPv6 address <PE 1 Addr 1> of the PE 1 may be carried in an SRv6-VPN SID TLV (for details, refer to draft-ietf-idr-bgp-prefix-sid-27 and draft-dawra-idr-srv6-vpn-04) in a BGP-prefix SID attribute of the BGP-VPN route message, and information about a source address X and a destination address mcastX of a multicast flow is included in the BGP-MVPN route message.

Alternatively, the IPv6 address <PE 1 Addr 1> of the PE 1 may be carried in an attribute of the BGP-EVPN route message.

Step 5: the PE 1 receives a second indication message, and determines that the PE 2 is a node that decapsulates the packet.

For example, the PE 1 may learn of the receiver PE 2 of the multicast data packet and the proxy node BR of the receiver PE 2 by using a parameter carried in the BGP-MVPN route message sent by the PE 2 to the PE1. For example, the BGP-MVPN route message includes a source address X and a group address mcastX, a BFR-ID value of the PE 2, and an IPv6 address <PE 2 Addr 1> of the PE 2. The PE 1 may learn of the receiver PE2 of the multicast data packet and the proxy node BR 2 of the receiver PE 2 by using the BGP-MVPN route message sent by the PE 2 to the PE 1 and preset configuration information locally configured on the PE 1. For example, the BGP-MVPN route message includes a source address X and a group address mcastX of the multicast data packet, the IPv6 address of the PE 2, and the BFR-ID of the PE 2. IPv6 address information <BR 2 Addr 1> that is of the proxy node BR 2 and that corresponds to the IPv6 address of the PE 2 is configured on the PE 1.

It may be understood that after a one-to-one correspondence between different IPv6 addresses and different pieces of VRF in the PE 2 is established on the control plane, packet forwarding may be performed on the forwarding plane. Here, the packet forwarding includes the following steps.

Step 1: the PE 1 receives a multicast data packet sent from the CE 1, where a source address (SA) carried in the multicast data packet is a SA (X) of the multicast data packet, and a destination address (DA) carried in the multicast data packet is a group address (mcastX) of the multicast data packet.

Step 2: the PE 1 encapsulates the multicast data packet to obtain a to-be-forwarded BIER packet.

The PE 1 first encapsulates an outer IPv6 header (where a source address of the outer IPv6 header is an IPv6 address #1), then encapsulates a destination option header, and finally uses an IP packet of an original multicast data packet as a payload of the to-be forwarded BIER packet. The PE 1 does not need to encapsulate a VpnLabel in a same method as the BIER packet forwarding method described above.

Based on different packet forwarding paths, the PE 1 encapsulates the packet in the following several cases:

Case 1: the BIER packet is forwarded to the PE 2 through the BR 2.

The PE 1 encapsulates an outer IPv6 header, where a source address carried in the outer IPv6 header is an IPv6 address #1, and a destination address carried in the outer IPv6 header is an IPv6 address of the BR 2.

The PE 1 encapsulates an IPv6 destination option header, where the IPv6 destination option header includes a BIER header, the BIER header carries bitstring information 000001, and a protocol field is 4 or 6 (Proto=4 or 6). Alternatively, the PE 1 encapsulates a BIER extension header, where BIER Info of the BIER extension header is 000001.

The PE 1 encapsulates no VpnLabel, but encapsulates an inner IPv6 or IPv4 header, where a source address carried in the inner IPv6 or IPv4 header is the source address of the multicast data packet, and a destination address carried in the inner IPv6 or IPv4 header is the group address of the multicast data packet.

A payload of the BIER packet is the IP packet of the original multicast data packet.

In this case, the BIER packet obtained by the first node through encapsulation is shown in Format 2 in FIG. 6(a). Hdr in FIG. 6(a) is short for Header.

Case 2: the BIER packet is forwarded to the BR 2 through the BR 1 and then forwarded to the PE 2 through the BR 2.

The PE 1 encapsulates an outer IPv6 header, where a source address carried in the outer IPv6 header is an IPv6 address #1, and a destination address carried in the outer IPv6 header is address information (for example, a BR 1 IPv6 address shown in FIG. 6(b)) of the BR 1.

The PE 1 encapsulates an SRH, where an address list (SL) carried in the SRH includes address information (BR 1 IPv6 address) of the BR 1 and address information (BR 2 IPv6 address) of the BR 2.

The PE 1 encapsulates an IPv6 destination option header, where the IPv6 destination option header includes a BIER header, the BIER header carries bitstring information 000001, and Proto is 4 or 6. Alternatively, the PE 1 encapsulates a BIER extension header, where the BIER extension header carries bitstring information 000001.

The PE 1 encapsulates no VpnLabel, but encapsulates an inner IPv6 or IPv4 header, where a source address carried in the inner IPv6 or IPv4 header is the source address of the multicast data packet, and a destination address carried in the inner IPv6 or IPv4 header is the group address of the multicast data packet.

A payload of the BIER packet is the IP packet of the original multicast data packet.

In this case, the BIER packet obtained by the first node through encapsulation is shown in Format 2 in FIG. 6(b). Hdr in FIG. 6(b) is short for Header.

In Case 2, after receiving the packet, the BR 2 removes the SRH, and changes the destination address of the IPv6 header of the BIER packet into a multicast group address (mcastY).

For example, that the BIER packet is forwarded to the BR 2 through the BR 1 may be that the PE 1 specifies through configuration that the BIER packet needs to pass through the node BR 1 to arrive at the proxy node BR 2. In this case, the PE 1 encapsulates an SRH during encapsulation. An address list carried in the SRH includes address information of the specified node BR 1 and the final node BR 2, and a destination address of the IPv6 header is filled with the node BR 1. The node BR 1 supports SRv6 function, copies the address that is of the node BR 2 and that is in the SRH to the destination address of the IPv6 header, and replicates the address to the node BR 2.

Step 3: the PE 2 decapsulates the BIER packet.

After receiving the BIER packet, the PE 2 determines, based on the bitstring 000001 in the packet, that the packet needs to be forwarded to a node whose BFR-ID is 1. In the foregoing information configuration process, the BFR-ID 1 is configured on the PE 2, to determine to decapsulate the received BIER packet. The decapsulation includes:

The PE 2 determines, based on a source address IPv6 address #1 of the outer IPv6 header, that the packet belongs to VRF #2.

Then, the PE 2 replicates and sends, based on a source address and a destination address of an inner IP packet following an outer IPv6 destination option header, the packet to an outbound interface corresponding to the VRF #2.

FIG. 6(a) and FIG. 6(b) each show a packet forwarding procedure when the PE 1 and the PE 2 are located in different IGP domains. The following describes, in detail with reference to FIG. 7, a packet forwarding procedure when a node that encapsulates a packet and a node that decapsulates a packet are located in a same IGP domain.

Figure 7:
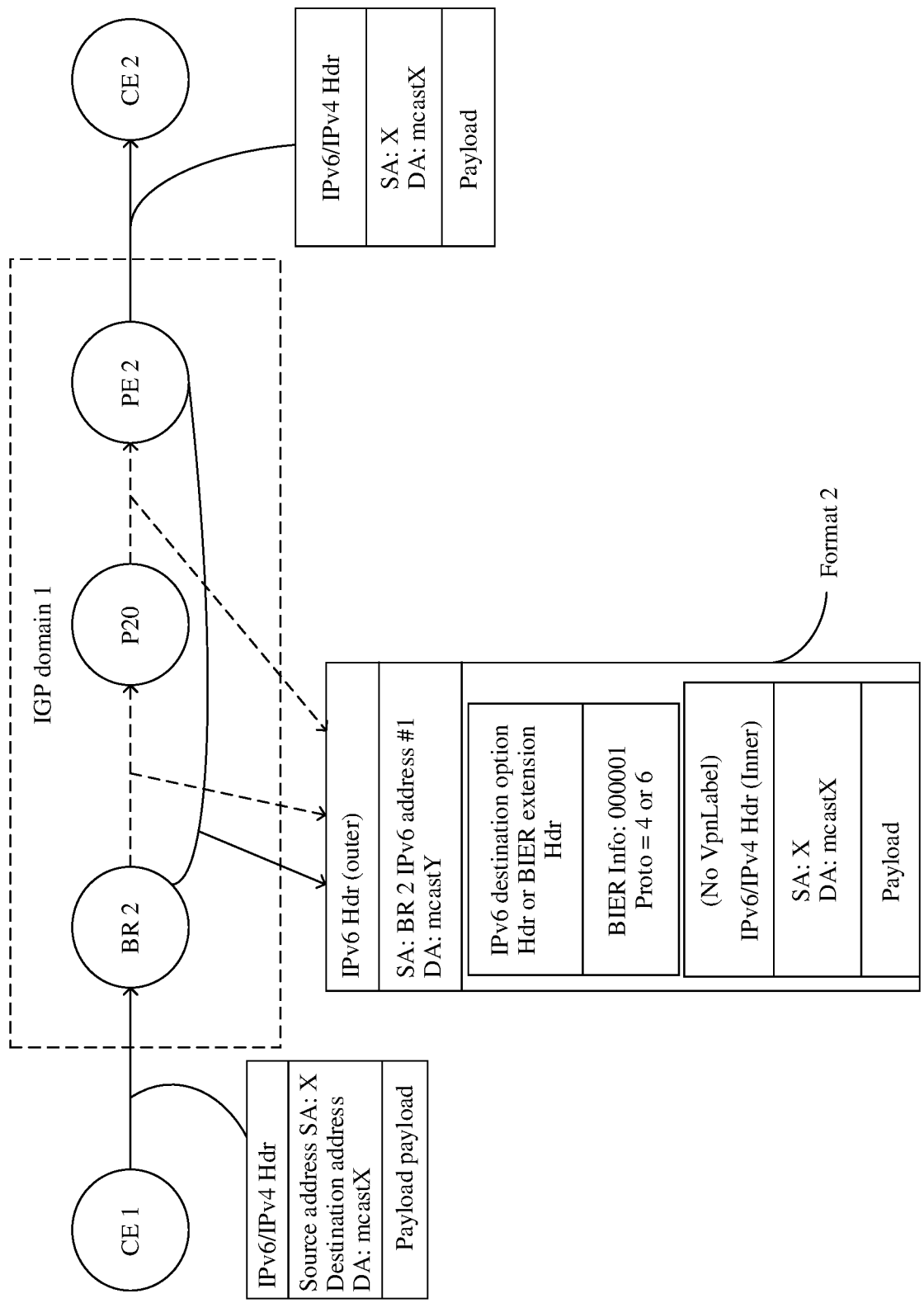
FIG. 7 is a schematic diagram of a second embodiment.

FIG. 7 is a schematic diagram of an embodiment 2. The schematic diagram includes three nodes (a PE 2, P20, and a BR 2 shown in FIG. 7) that belong to an IGP domain 1, and a node CE 1 that is outside the IGP domain 1 and that is connected to the edge node PE 2 in the IGP domain 1.

For example, in FIG. 7, the CE 1 is a node that needs to forward a multicast data packet, for example, may be a terminal device or a network device. The BR 2 is a router that supports BIER IPv6 encapsulation. For example, the BR 2 receives a multicast data packet from the CE 1, and the BR 2 can encapsulate an outer IPv6 header and a BIER IPv6 header (namely, an IPv6 destination option header) for the multicast data packet.

A difference between the process of establishing the correspondence between the IPv6 address and the VRF on the control plane in embodiment 2 and the process shown in FIG. 6 lies in that there is no need to configure a BFR-ID on the BR 2. Another process on the control plane is similar to that in embodiment 2 and is not described herein again.

Packet forwarding is performed on the forwarding plane. Packet forwarding includes the following steps.

Step 1: the BR 2 receives a multicast data packet sent from the CE 1, where the multicast data packet carries a source address (SA<X>) of the multicast data packet and a group address (DA<mcastX>) of the multicast data packet.

Step 2: the BR 2 encapsulates the multicast data packet to obtain a to-be-forwarded BIER packet.

The BR 2 first encapsulates an outer IPv6 header (where a source address of the outer IPv6 header is an IPv6 address #1), then encapsulates a destination option header, and finally uses an IP packet of an original multicast data packet as a payload of the to-be forwarded BIER packet. The BR 2 does not need to encapsulate a VpnLabel in a same method as the BIER packet forwarding method described above.

An encapsulation procedure includes:

The BR 2 encapsulates an outer IPv6 header, where a source address carried in the outer IPv6 header is an IPv6 address #1, and a destination address carried in the outer IPv6 header is a group address (DA<mcastY>).

The BR 2 encapsulates an IPv6 destination option header, where the IPv6 destination option header includes a BIER header, the BIER header carries bitstring information 000001, and Proto is 4 or 6. Alternatively, the PE 1 encapsulates a BIER extension header, where the BIER extension header carries bitstring information 000001.

The BR 2 encapsulates no VpnLabel, but encapsulates an inner IPv6 or IPv4 header, where a source address carried in the inner IPv6 or IPv4 header is the source address of the multicast data packet, and a destination address carried in the inner IPv6 or IPv4 header is the group address of the multicast data packet.

A payload of the BIER packet is the IP packet of the original multicast data packet.

In this case, the BIER packet obtained by the first node through encapsulation is shown in Format 2 in FIG. 7. Hdr in FIG. 7 is short for Header.

Step 3: the PE 2 decapsulates the BIER packet.

After receiving the BIER packet, the PE 2 determines, based on the bitstring 000001 in the packet, that the packet needs to be forwarded to a node whose BFR-ID is 1. In the foregoing information configuration process, the BFR-ID 1 is configured on the PE 2, to determine to decapsulate the received BIER packet. The decapsulation includes:

The PE 2 determines, based on a source address IPv6 address #1 of the outer IPv6 header, that the packet belongs to VRF #2.

Then, the PE 2 replicates and sends, based on a source address and a destination address of an inner IP packet following an outer IPv6 destination option header, the packet to an outbound interface corresponding to the VRF #2.

According to the packet forwarding method provided in this embodiment, first, on the control plane, the head node has a plurality of IPv6 addresses that are in a one-to-one correspondence with a plurality of pieces of VRF, and uses the message to carry the IPv6 address and the VRF identifier and sends the message to the tail node; and the tail node only needs to establish the forwarding entry based on the IPv6 address and the VRF identifier, to simplify a process of establishing the forwarding entry by the tail node. Then, on the forwarding plane, when encapsulating and sending the BIER IPv6 packet, the head node does not need to encapsulate the VpnLabel before the inner IP packet; and the tail node receives the IPv6 BIER packet, learns, based on the IPv6 address, of specific VRF that corresponds to the tail node and to which the packet belongs, and then determines, based on the inner packet, that the packet is replicated and sent to an outbound interface corresponding to the VRF, to improve packet forwarding performance.

The foregoing describes in detail the packet forwarding methods provided in the embodiments with reference to FIG. 4 to FIG. 7. The following describes in detail a packet sending apparatus and a packet receiving apparatus provided in embodiments with reference to FIG. 8 to FIG. 11.

Figure 8:
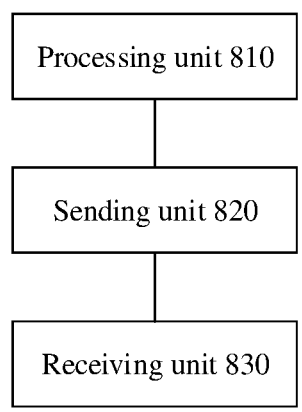
FIG. 8 is a schematic structural diagram of a packet sending apparatus according to an embodiment.

FIG. 8 is a schematic structural diagram of a packet sending apparatus according to an embodiment. The packet sending apparatus is a node that encapsulates a packet in the foregoing multicast VPN, and includes a processing unit 810, a receiving unit 820, and a sending unit 830.

The processing unit 810 is configured to: configure a first identifier of a first VPN and a first internet protocol version 6 IPv6 address, where the first IPv6 address corresponds to the first identifier; and after receiving a multicast data packet that belongs to the first VPN, obtain the first IPv6 address based on the first VPN to which the multicast data packet belongs and the first IPv6 address corresponding to the first identifier, and encapsulate the multicast data packet based on the first IPv6 address, to obtain a to-be-forwarded BIER packet.

The sending unit 830 is configured to send a first indication message to a second node, where the first indication message is used to indicate the second node to establish a correspondence between the first IPv6 address and a second identifier, the first indication message includes the first identifier and the first IPv6 address, and the second identifier is an identifier that is of the second node and that satisfies a preset correspondence with the first identifier; and send the to-be-forwarded BIER packet to the second node.

The receiving unit 820 is configured to: receive the multicast data packet and receive a second indication message sent by the second node.

The packet sending apparatus shown in FIG. 8 completely corresponds to the first node in the method embodiments. Corresponding units in the packet sending apparatus shown in FIG. 8 are configured to perform corresponding steps performed by the first node in the method embodiments shown in FIG. 4 to FIG. 7.

The receiving unit 820 in the packet sending apparatus shown in FIG. 8 performs the receiving step in the method embodiments, for example, performs S140 of receiving the second indication message from the second node in FIG. 4. The processing unit 810 performs a step implemented or processed in the first node in the method embodiments, for example, performs S110 of configuring the VPN information in FIG. 4 and S160 of encapsulating the multicast data packet in FIG. 4. The sending unit 830 performs the sending step in the method embodiments, for example, performs S130 of sending the first indication message to the second node in FIG. 4.

Optionally, the receiving unit 820 and the sending unit 830 may form a transceiver unit that has both receiving and sending functions. The processing unit 820 may be a processor. The transceiver unit formed by the receiving unit 820 and the sending unit 830 may be a communications interface.

Figure 9:
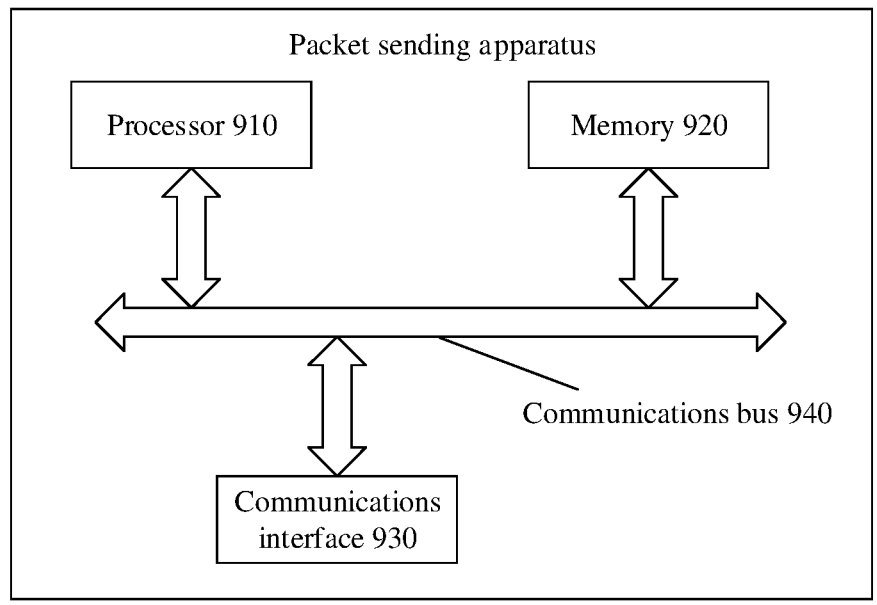
FIG. 9 is a schematic structural diagram of another packet sending apparatus according to an embodiment.

FIG. 9 is a schematic structural diagram of another packet sending apparatus according to an embodiment. The packet sending apparatus shown in FIG. 9 may include a processor 910, a memory 920, and a communications interface 930. The processor 910, the memory 920, and the communications interface 930 may be connected through a communications bus 940. The processor 910 includes at least one physical processor, and the communications interface 930 includes at least one physical interface. The memory 930 is configured to store information such as a program and an IP address of a first node.

The packet sending apparatus shown in FIG. 9 and the packet sending apparatus shown in FIG. 8 may be a same BFIR in a BIER network, for example, the PE 1 in FIG. 6. FIG. 8 shows content included in the packet sending apparatus from a logical perspective, and FIG. 9 shows content included in the packet sending apparatus from a physical perspective. The receiving unit 820 and the sending unit 830 in FIG. 8 may be implemented by using the communications interface 930 in FIG. 9, and the processing unit 810 in FIG. 8 may be implemented by using the processor 910 in FIG. 9.

The processor 910 performs the operation of the processing unit 810 in FIG. 8 according to executable instructions included in the program read from the memory 920.

The communications interface 930 performs the operations of the receiving unit 820 and the sending unit 830 in FIG. 8.

Figure 10:
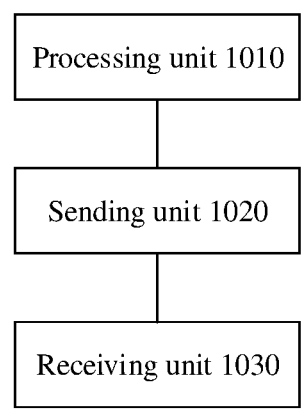
FIG. 10 is a schematic structural diagram of a packet receiving apparatus according to an embodiment.

FIG. 10 is a schematic structural diagram of a packet receiving apparatus according to an embodiment. The packet receiving apparatus is a node that decapsulates a packet in the foregoing multicast VPN, and includes a processing unit 1010, a receiving unit 1020, and a sending unit 1030.

The receiving unit 1020 is configured to: receive a first indication message from a first node, where the first indication message includes a first identifier of a first VPN and a first IPv6 address, and the first identifier corresponds to the first IPv6 address; and receive a BIER packet from the first node, where the BIER packet includes the first IPv6 address and a multicast data packet.

The processing unit 1010 is configured to: establish a correspondence between the first IPv6 address and a second identifier based on the first IPv6 address and the first identifier, where the second identifier is an identifier that is of the second node and that satisfies a preset correspondence with the first identifier; and determine, based on the first IPv6 address and the correspondence between the first IPv6 address and the second identifier, that the sending unit sends the multicast data packet to an interface corresponding to the second identifier.

The sending unit 1030 is configured to send the multicast data packet to the interface corresponding to the second identifier.

The packet receiving apparatus shown in FIG. 10 completely corresponds to the second node in the method embodiments. Corresponding units in the packet receiving apparatus shown in FIG. 10 are configured to perform corresponding steps performed by the second node in the method embodiments shown in FIG. 4 to FIG. 7.

The receiving unit 1020 in the packet receiving apparatus shown in FIG. 10 performs the receiving step in the method embodiments, for example, performs S130 of receiving the first indication message from the first node in FIG. 4. The processing unit 1010 performs a step implemented or processed in the second node in the method embodiments, for example, performs S120 of configuring the VPN information in FIG. 4 and S180 of decapsulating the BIER packet in FIG. 4. The sending unit 1030 performs the sending step in the method embodiments, for example, performs S140 of sending the second indication message to the first node in FIG. 4.

Optionally, the receiving unit 1020 and the sending unit 1030 may form a transceiver unit that has both receiving and sending functions. The processing unit 1010 may be a processor. The transceiver unit formed by the receiving unit 1020 and the sending unit 1030 may be a communications interface.

Figure 11:
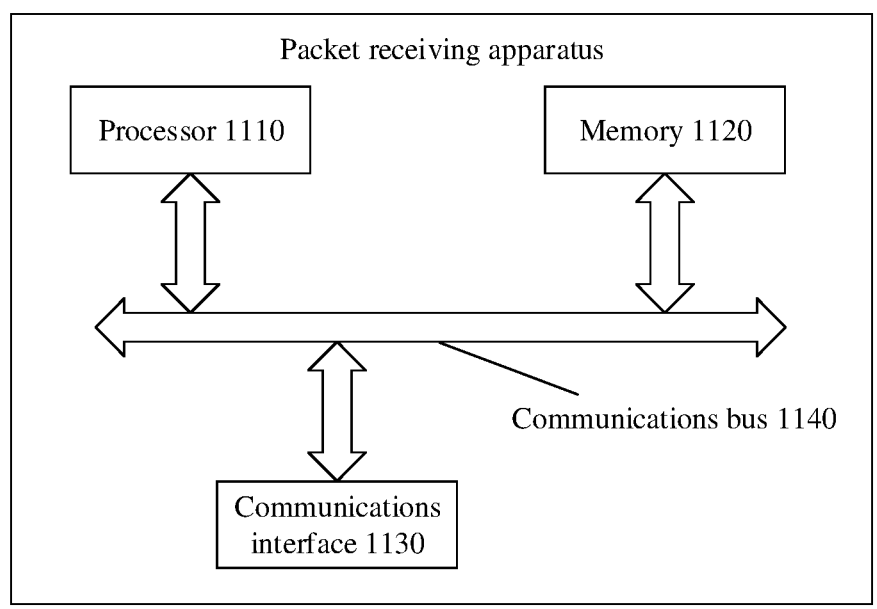
FIG. 11 is a schematic structural diagram of another packet receiving apparatus according to an embodiment.

FIG. 11 is a schematic structural diagram of another packet receiving apparatus according to an embodiment. The packet receiving apparatus shown in FIG. 11 may include a processor 1110, a memory 1120, and a communications interface 1130. The processor 1110, the memory 1120, and the communications interface 1130 may be connected through a communications bus 1140. The processor 1110 includes at least one physical processor, and the communications interface 1130 includes at least one physical interface. The memory 1130 is configured to store information such as a program and an IP address of a second node.

The packet receiving apparatus shown in FIG. 11 and the packet receiving apparatus shown in FIG. 10 may be a same BFIR in a BIER network, for example, the PE 2 in FIG. 6. FIG. 10 shows content included in the packet receiving apparatus from a logical perspective, and FIG. 11 shows content included in the packet receiving apparatus from a physical perspective. The receiving unit 1020 and the sending unit 1030 in FIG. 10 may be implemented by using the communications interface 1130 in FIG. 11, and the processing unit 1010 in FIG. 10 may be implemented by using the processor 1110 in FIG. 11.

The processor 1110 performs the operation of the processing unit 1010 in FIG. 10 according to executable instructions included in the program read from the memory 1120.

The communications interface 1130 performs the operations of the receiving unit 1020 and the sending unit 1030 in FIG. 10.

An embodiment further provides a packet forwarding device, including the foregoing one or more first nodes and second nodes.

The embodiments further provides a computer readable storage medium. The computer readable storage medium stores instructions. When the instructions are run on a computer, the computer is enabled to perform the steps performed by the first node in the methods shown in FIG. 4 to FIG. 7.

The embodiments further provides a computer readable storage medium. The computer readable storage medium stores instructions. When the instructions are run on a computer, the computer is enabled to perform the steps performed by the second node in the methods shown in FIG. 4 to FIG. 7.

The embodiments further provides a computer program product including instructions. When the computer program product runs on a computer, the computer is enabled to perform the steps performed by the first node in the methods shown in FIG. 4 to FIG. 7.

The embodiments further provides a computer program product including instructions. When the computer program product runs on a computer, the computer is enabled to perform the steps performed by the second node in the methods shown in FIG. 4 to FIG. 7.

The embodiments further provides a chip, including a processor. The processor is configured to: read and run a computer program stored in a memory, to perform a corresponding operation and/or procedure performed by the first node in the packet forwarding method provided. Optionally, the chip further includes the memory. The memory is connected to the processor through a circuit or a cable. The processor is configured to: read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

The embodiments further provides a chip, including a processor. The processor is configured to: invoke and run a computer program stored in a memory, to perform a corresponding operation and/or procedure performed by the second node in the packet forwarding method. Optionally, the chip further includes the memory. The memory is connected to the processor through a circuit or a cable. The processor is configured to: read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

In the foregoing embodiments, the processor may be a central processing unit (CPU), a microprocessor, an application-specific integrated circuit (ASIC), one or more integrated circuits for controlling program execution in the solutions of the embodiments, or the like. For example, the processor may be a digital signal processor device, a microprocessor device, an analog-to-digital converter, and a digital-to-analog converter. The processor may allocate control and signal processing functions of a terminal device or a network device between these devices based on respective functions of these devices. In addition, the processor may have a function of operating one or more software programs. The software programs may be stored in the memory. The function of the processor may be implemented by hardware, or may be implemented by hardware by executing corresponding software. The hardware or the software includes one or more modules corresponding to the foregoing function.

The memory may be a read-only memory (ROM), another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, any other medium that can be used to carry or store expected program code in a form of an instruction or a data structure and that can be accessed by a computer, or the like.

Optionally, the memory and the processor may be physically independent units, or the memory may be integrated into the processor.

In the embodiments, "at least one" means one or more, and "a plurality of" means two or more. The term "and/or" describes an association relationship for describing associated objects and represents that three relationships may exist. For example, A and/or B may represent: only A exists, both A and B exist, and only B exists. A and B may be singular or plural. The character "/" usually indicates an "or" relationship between the associated objects. "At least one of the following" or a similar expression thereof indicates any combination of the following, including any combination of one or more of the following. For example, at least one of a, b, and c may indicate a, b, c, a and b, a and c, b and c, or a, b, and c, where a, b, and c may be singular or plural.

A person of ordinary skill in the art may be aware that units, algorithms, and steps described in the embodiments can be implemented by electronic hardware or a combination of computer software and electronic hardware. Whether the functions are performed by hardware or software depends on particular applications and design constraints of the solutions. A person of ordinary skill in the art may use different methods to implement the described functions for each particular embodiment, but it should not be considered that the implementation goes beyond the scope of the embodiments.

It may be understood by a person of ordinary skill in the art that for the purpose of convenient and brief descriptions, for a detailed working process of the foregoing system, apparatus, and unit, reference may be made to a corresponding process in the foregoing method embodiment. Details are not described herein again.

In the several embodiments, the disclosed system, apparatus and method may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may not be physically separate, and parts displayed as units may not be physical units, and may be located in one position, or may be distributed on a plurality of network units. Some or all of the units may be selected based on an actual requirement to achieve the objectives of the solutions of the embodiments.

In addition, function units in the embodiments may be integrated into one processing unit, each of the units may exist alone physically, or two or more units are integrated into one unit.

When the functions are implemented in a form of a software function unit and sold or used as an independent product, the functions may be stored in a computer readable storage medium. Based on such an understanding, the solutions in the embodiments essentially, or the part contributing to the prior art, or some of the solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The storage medium includes any medium that can store program code, such as a USB flash drive, a removable hard disk, ROM, a RAM, a magnetic disk, or an optical disc.

The foregoing descriptions are merely implementations of the embodiment and should be considered as non-limiting.

What is claimed is:

1. A packet forwarding method, applied to a multicast virtual private network (VPN) over bit index explicit replication (BIER), the method comprising:
    configuring, by a first node, a first identifier of a first VPN and a first internet protocol version 6 (IPv6) address, wherein the first IPv6 address corresponds to the first identifier;
    sending, by the first node, a first indication message to a second node, wherein the first indication message is used to indicate the second node to establish a correspondence between the first IPv6 address and a second identifier, the first indication message comprises the first identifier and the first IPv6 address, and the second identifier is an identifier that is of the second node and that satisfies a preset correspondence with the first identifier;
    receiving, by the first node, a multicast data packet that belongs to the first VPN;
    obtaining, by the first node, the first IPv6 address based on the first VPN to which the multicast data packet belongs and the first IPv6 address corresponding to the first identifier; and
    encapsulating, by the first node, the multicast data packet based on the first IPv6 address to obtain a to-be-forwarded BIER packet, and sending the to-be-forwarded BIER packet to the second node for decapsulation, wherein the to-be-forwarded BIER packet comprises the first IPv6 address used to determine an interface corresponding to the second identifier to send the multicast data packet,
    wherein the first IPv6 address is used to determine an interface corresponding to another identifier of a far-end node, and the other identifier of the far-end node satisfies a preset correspondence with the first identifier.

2. The method according to claim 1, wherein before the encapsulating, by the first node, of the multicast data packet based on the first IPv6 address, the method further comprises:
    receiving, by the first node, a second indication message sent by the second node, wherein the second indication message comprises an IPv6 address of the second node; and
    obtaining, by the first node, an IPv6 address of a proxy node based on the second indication message and preset configuration information, wherein the preset configuration information comprises a correspondence between the IPv6 address of the second node and the IPv6 address of the proxy node; and
    the encapsulating, by the first node, of the multicast data packet based on the first IPv6 address to obtain a to-be-forwarded BIER packet, and sending the to-be-forwarded BIER packet comprises:
    encapsulating, by the first node, an IPv6 header at an outer layer of the multicast data packet to obtain the to-be-forwarded BIER packet, wherein a source address of the IPv6 header is the first IPv6 address, and a destination address of the IPv6 header is the IPv6 address of the proxy node; and
    sending, by the first node, the to-be-forwarded BIER packet to the second node based on the IPv6 header through the proxy node.

3. The method according to claim 1, wherein before the encapsulating, by the first node, of the multicast data packet based on the first IPv6 address, the method further comprises:
    receiving, by the first node, a second indication message sent by the second node, wherein the second indication message comprises an IPv6 address of the second node; and
    obtaining, by the first node, an IPv6 address of a specified node and an IPv6 address of a proxy node based on the second indication message and preset configuration information, wherein the preset configuration information comprises a correspondence between the IPv6 address of the second node, the IPv6 address of the specified node, and the IPv6 address of the proxy node; and
    the encapsulating, by the first node, of the multicast data packet based on the first IPv6 address to obtain a to-be-forwarded BIER packet, and sending the to-be-forwarded BIER packet comprises:
    encapsulating, by the first node, a segment routing header (SRH) at an outer layer of the multicast data packet, wherein the SRH carries an address list, and the address list comprises the IPv6 address of the specified node and the IPv6 address of the proxy node;
    encapsulating, by the first node, an IPv6 header at an outer layer of the SRH to obtain the to-be-forwarded BIER packet, wherein a source address of the IPv6 header is the first IPv6 address, and a destination address of the IPv6 header is the IPv6 address of the specified node; and
    sending, by the first node, the to-be-forwarded BIER packet to the second node based on the SRH and the IPv6 header through the specified node and the proxy node.

4. A packet forwarding method, applied to a multicast virtual private network (VPN) over bit index explicit replication (BIER), the method comprising:
    receiving, by a second node, a first indication message from a first node, wherein the first indication message comprises a first internet protocol version 6 (IPv6) address and a first identifier of a first VPN, and the first IPv6 address corresponds to the first identifier;
    establishing, by the second node, a correspondence between the first IPv6 address and a second identifier based on the first IPv6 address and the first identifier, wherein the second identifier is an identifier that is of the second node and that satisfies a preset correspondence with the first identifier;
    receiving, by the second node, a BIER packet from the first node, wherein the BIER packet comprises the first IPv6 address and a multicast data packet; and
    sending, by the second node based on the first IPv6 address and the correspondence, the multicast data packet to an interface corresponding to the second identifier.

5. The method according to claim 4, wherein before the receiving, by the second node, of the BIER packet from the first node, the method further comprises:

sending, by the second node, a second indication message to the first node, wherein the second indication message comprises an IPv6 address of the second node.

6. The method according to claim 4, wherein the sending, by the second node based on the first IPv6 address and the correspondence, of the multicast data packet to an interface corresponding to the second identifier comprises:

obtaining, by the second node, the second identifier based on the first IPv6 address and the correspondence; and after determining that the multicast data packet comprises an address of a multicast source and an address of a multicast group, obtaining, by the second node, at least one interface corresponding to the second identifier, and sending the multicast data packet through the at least one interface, wherein the address of the multicast source is an address of a multicast source that needs to be received by the second node, and the address of the multicast group is an address of a multicast group that the second node joins.

7. A packet sending apparatus, applied to a multicast virtual private network (VPN) over bit index explicit replication (BIER), the apparatus comprising:

a processor; and a non-transitory computer-readable storage medium coupled to the processor and storing programming instructions for execution by the processor, the programming instructions instruct the packet sending apparatus to:

configure a first identifier of a first virtual private network VPN and a first internet protocol version 6 (IPv6) address, wherein the first IPv6 address corresponds to the first identifier;

send a first indication message to a second node, wherein the first indication message is used to indicate the second node to establish a correspondence between the first IPv6 address and a second identifier, the first indication message comprises the first identifier and the first IPv6 address, and the second identifier is an identifier that is of the second node and that satisfies a preset correspondence with the first identifier;

receive a multicast data packet that belongs to the first VPN;

obtain the first IPv6 address based on the first VPN to which the multicast data packet belongs and the first IPv6 address corresponding to the first identifier; and encapsulate the multicast data packet based on the first IPv6 address to obtain a to-be-forwarded BIER packet, wherein the to-be-forwarded BIER packet is sent by the packet sending apparatus to the second node for decapsulation, and the to-be-forwarded BIER packet comprises the first IPv6 address used to determine an interface corresponding to the second identifier to send the multicast data packet, wherein the first IPv6 address is used to determine an interface corresponding to another identifier of a far-end node, and the other identifier of the far-end node satisfies a preset correspondence with the first identifier.

8. The apparatus according to claim 7, wherein before encapsulating the multicast data packet based on the first IPv6 address, the programming instructions further instruct the packet sending apparatus to:

receive a second indication message sent by the second node, wherein the second indication message comprises an IPv6 address of the second node;

obtain an IPv6 address of a proxy node based on the second indication message and preset configuration information, wherein the preset configuration information comprises a correspondence between the IPv6 address of the second node and the IPv6 address of the proxy node;

encapsulate an IPv6 header at an outer layer of the multicast data packet to obtain the to-be-forwarded BIER packet, wherein a source address of the IPv6 header is the first IPv6 address, and a destination address of the IPv6 header is the IPv6 address of the proxy node; and send the to-be-forwarded BIER packet to the second node based on the IPv6 header through the proxy node.

9. The apparatus according to claim 7, wherein before encapsulating the multicast data packet based on the first IPv6 address, the programming instructions further instruct the packet sending apparatus to:

receive a second indication message sent by the second node, wherein the second indication message comprises an IPv6 address of the second node;

obtain an IPv6 address of a specified node and an IPv6 address of a proxy node based on the second indication message and preset configuration information, wherein the preset configuration information comprises a correspondence between the IPv6 address of the second node, the IPv6 address of the specified node, and the IPv6 address of the proxy node; and encapsulate a segment routing header (SRH) at an outer layer of the multicast data packet, wherein the SRH carries an address list, and the address list comprises the IPv6 address of the specified node and the IPv6 address of the proxy node;

encapsulate an IPv6 header at an outer layer of the SRH to obtain the to-be-forwarded BIER packet, wherein a source address of the IPv6 header is the first IPv6 address, and a destination address of the IPv6 header is the IPv6 address of the specified node; and send the to-be-forwarded BIER packet to the second node based on the SRH and the IPv6 header through the specified node and the proxy node.

10. A packet receiving apparatus, applied to a multicast virtual private network (VPN) over bit index explicit replication (BIER), and comprising:

a processor; and a non-transitory computer-readable storage medium coupled to the processor and storing programming instructions for execution by the processor, the programming instructions instruct the packet receiving apparatus to:

receive a first indication message from a first node, wherein the first indication message comprises a first identifier of a first VPN and a first internet protocol version 6 (IPv6) address, and the first identifier corresponds to the first IPv6 address; and establish a correspondence between the first IPv6 address and a second identifier based on the first IPv6 address and the first identifier, wherein the second identifier is an identifier that is of the second node and that satisfies a preset correspondence with the first identifier, wherein receive a BIER packet from the first node, wherein the BIER packet comprises the first IPv6 address and a multicast data packet; and determine, based on the first IPv6 address and the correspondence, that the packet receiving apparatus sends the multicast data packet to an interface corresponding to the second identifier.

11. The apparatus according to claim 10, wherein before receiving the BIER packet from the first node, the programming instructions further instruct the packet receiving apparatus to:
send a second indication message to the first node, wherein the second indication message comprises an IPv6 address of the second node.

12. The apparatus according to claim 10, wherein the programming instructions instruct the packet receiving apparatus to:
obtain the second identifier based on the first IPv6 address and the correspondence; and
after determining that the multicast data packet comprises an address of a multicast source and an address of a multicast group, obtain at least one interface corresponding to the second identifier, and determine that the packet receiving apparatus sends the multicast data packet through the at least one interface, wherein the address of the multicast source is an address of a multicast source that needs to be received by the second node, and the address of the multicast group is an address of a multicast group that the second node joins.

* * * * *